United States Patent
Mi et al.

(10) Patent No.: US 7,466,484 B2
(45) Date of Patent: *Dec. 16, 2008

(54) WIRE GRID POLARIZERS AND OPTICAL ELEMENTS CONTAINING THEM

(75) Inventors: Xiang-Dong Mi, Rochester, NY (US); David Kessler, Rochester, NY (US); Lee W. Tutt, Webster, NY (US); Laura A. Weller-Brophy, Pittsford, NY (US); Tomohiro Ishikawa, Rochester, NY (US)

(73) Assignee: Rohm and Haas Denmark Finance A/S, Copenhagen (DK)

( * ) Notice: Subject to any disclaimer, the term of this patent is extended or adjusted under 35 U.S.C. 154(b) by 0 days.

This patent is subject to a terminal disclaimer.

(21) Appl. No.: 11/442,861

(22) Filed: May 30, 2006

(65) Prior Publication Data

US 2006/0215263 A1  Sep. 28, 2006

Related U.S. Application Data

(63) Continuation-in-part of application No. 10/948,345, filed on Sep. 23, 2004.

(51) Int. Cl.
  *G02B 5/30*  (2006.01)

(52) U.S. Cl. .................. 359/486; 359/495; 362/606; 362/607

(58) Field of Classification Search .............. None
  See application file for complete search history.

(56) References Cited

U.S. PATENT DOCUMENTS

| | | | | |
|---|---|---|---|---|
| 4,514,479 | A * | 4/1985 | Ferrante | 430/2 |
| 6,288,840 | B1 * | 9/2001 | Perkins et al. | 359/486 |
| 6,590,695 | B1 * | 7/2003 | Kurtz et al. | 359/291 |
| 6,752,505 | B2 * | 6/2004 | Parker et al. | 362/627 |
| 2003/0112510 | A1 * | 6/2003 | Florence | 359/486 |
| 2004/0008310 | A1 * | 1/2004 | Leidig et al. | 349/124 |
| 2004/0228106 | A1 * | 11/2004 | Stevenson et al. | 362/31 |
| 2004/0239833 | A1 * | 12/2004 | Kawazu et al. | 349/96 |
| 2005/0041311 | A1 * | 2/2005 | Mi et al. | 359/831 |
| 2005/0128587 | A1 * | 6/2005 | Suganuma | 359/486 |

OTHER PUBLICATIONS

U.S. Appl. No. 10/948,345, filed Sep. 23, 2004.

* cited by examiner

*Primary Examiner*—Arnel C Lavarias
(74) *Attorney, Agent, or Firm*—Edwin Oh

(57) ABSTRACT

The invention relates to an optical element including a substrate, a wire grid on one side of said substrate, and prismatic light collimating features on the other side of said substrate

19 Claims, 19 Drawing Sheets

ND OPTICAL
WIRE GRID POLARIZERS AND OPTICAL ELEMENTS CONTAINING THEM

CROSS-REFERENCE TO RELATED APPLICATIONS

This is a continuation-in-part application of U.S. application Ser. No. 10/948,345 filed Sep. 23, 2004, entitled "LOW FILL FACTOR WIRE GRID POLARIZER AND METHOD OF USE" by Xiang-Dong Mi et al.

FIELD OF THE INVENTION

A wire grid polarizer in combination with other optical components is described for use in enhancing light efficiency. A process of making a low fill factor wire grid polarizer is described.

BACKGROUND OF THE INVENTION

Light-valves are implemented in a wide variety of display technologies. For example, display and microdisplay panels are gaining in popularity in many applications such as televisions, computer monitors, point of sale displays, personal digital assistants and electronic cinema to mention a few applications.

Many light valves are based on liquid crystal (LC) technologies. In some LC technologies light is transmitted through an LC device (panel), while in others the light traverses the panel twice, after being reflected at a far surface of the panel.

In operation, an external field or voltage is used to selectively rotate the axes of the molecules of the LC material. As is well known, by application of this voltage across the LC panel, the direction of the LC molecules can be controlled and the state of polarization of the reflected light is selectively changed. As such, by selective switching of the transistors in the array, the LC medium can be used to modulate the light with image information.

In many LCD systems, light modulation results in dark-state light at certain picture elements (pixels) and bright-state light at others, where the polarization state governs the amount of light transmitted by each pixel element. Thereby, an image is created on a screen by the selective polarization transformation by the LC panel and optics to form the image or 'picture.'

While LCD devices are becoming ubiquitous in display and microdisplay applications, there are certain drawbacks associated with known devices. For example, in known devices some of the light from the light source may be irrecoverably lost and the overall brightness of the image adversely impacted.

This loss of light in display systems may be from a variety of sources within the display system. In many LCD systems, the light from a source is selectively polarized in a particular orientation prior to being incident on the LC panel. This selective polarization may be effected by an absorptive polarizer. The LC panel may have a voltage selectively applied to orient the molecules of the material in a certain manner. The polarization of the light that is incident on the LC panel is selectively altered upon traversing through the LC layer. Light in one linear polarization state is transmitted by a polarizer (often referred to as an analyzer) as the bright state light; while light of an orthogonal polarization state is absorbed by the analyzer as the dark-state light. As can be appreciated, approximately one-half of the light energy is lost in such a system, due to absorption by the first linear polarizer.

In other display and microdisplay structures, a reflective polarizer may be used for polarization selectivity. Sometimes, the reflective polarizer is placed between a light source and the LC panel in order to provide light (polarization) recycling, wherein one polarization state is desirably transmitted by the reflective polarizer and one polarization state is reflected back toward the light source. In known systems using reflective polarizers, there are competing objectives that impede the polarization recycling. These competing objectives include light transmission efficiency and polarization extinction. For example, wire-grid polarizers may be used as the reflective polarizer. Known wire-grid polarizers have a relatively high extinction ratio. Such known wire-grid polarizers are not desirable in light recycling because the total light throughput is unacceptably low. This can result in unacceptable contrast and brightness in the viewed image.

Alternatively, plastic reflective polarizers comprising multilayer films or immiscible layered materials may be used in displays. Known plastic polarizers have a relatively low extinction ration and relatively high transmission. Such known plastic polarizers are not desirable in light recycling when used with very strong backlights as the plastics can 'yellow' due to light absorption. This can result in unacceptable coloration of the viewed image. An apparatus that overcomes at least the drawbacks of known devices described above is disclosed in U.S. application Ser. No. 10/948,345, filed Sep. 23, 2004. However, some problems remain, for example, additional separate prismatic light controlling film or components are needed, which increases the complexity of the entire display system.

PROBLEM TO BE SOLVED BY THE INVENTION

The problem to be solved is to reduce the number of individual optical elements in a display system, and increase the display environment stability.

BRIEF DESCRIPTION OF THE INVENTION

It is an object of the invention to provide an integrated optical element having a wire grid, which has a capability of recycling light of undesired polarization, and collimating light.

It is another object to provide an integrated optical element having a wire grid, which has reduced sensitivity to change in heat and humidity.

These and other objects of the invention are accomplished by an optical element comprising a substrate, a wire grid on one side of said substrate, and prismatic light collimating features on the other side of said substrate.

ADVANTAGEOUS EFFECT OF THE INVENTION

The invention provides enhanced optical efficiency, fewer number of optical elements, less sensitive to heat and humidity.

BRIEF DESCRIPTION OF THE DRAWINGS

The invention is best understood from the following detailed description when read with the accompanying drawing figures. It is emphasized that the various features are not necessarily drawn to scale. In fact, the dimensions may be arbitrarily increased or decreased for clarity of discussion.

DETAILED DESCRIPTION OF THE INVENTION

In the following detailed description, for purposes of explanation and not limitation, example embodiments disclosing specific details are set forth in order to provide a thorough understanding of the present invention. However, it will be apparent to one having ordinary skill in the art having had the benefit of the present disclosure, that the present invention may be practiced in other embodiments that depart from the specific details disclosed herein. Moreover, descriptions of well-known apparati and methods may be omitted so as to not obscure the description of the example embodiments. Such methods and apparati are clearly within the contemplation of the inventors in carrying out the example embodiments. Wherever possible, like numerals refer to like features throughout.

Briefly, and as described in detail in conjunction with example embodiments, a wire grid polarizer and a display system including a wire grid polarizer are disclosed. The wire grid polarizer includes a plurality of conductors having a width, a height and a pitch. In an example embodiment, the wire grid polarizer has a duty cycle chosen to substantially optimize the total light throughput, which is a function of the transmittance of light of a first polarization state through and the reflectance of light of a second polarization state from the wire grid polarizer.

In one example embodiment, the ratio of the height to the pitch of the wire grid polarizer is chosen to substantially optimize total light throughput. In this manner, a greater percentage of the light may be reflected and then transmitted through the wire grid polarizer and the absorptive polarizer, and thereby improve the brightness and contrast of an image provided through the display system.

In another example embodiment the reflected light may be depolarized using a diffusive reflector and reflected back to the polarizer. In yet another example embodiment, the reflected light may traverse a quarter wave retarder, be reflected by a reflector, and traverse the quarter wave retarder a second time before being incident on the wire grid polarizer.

Figure 1A:
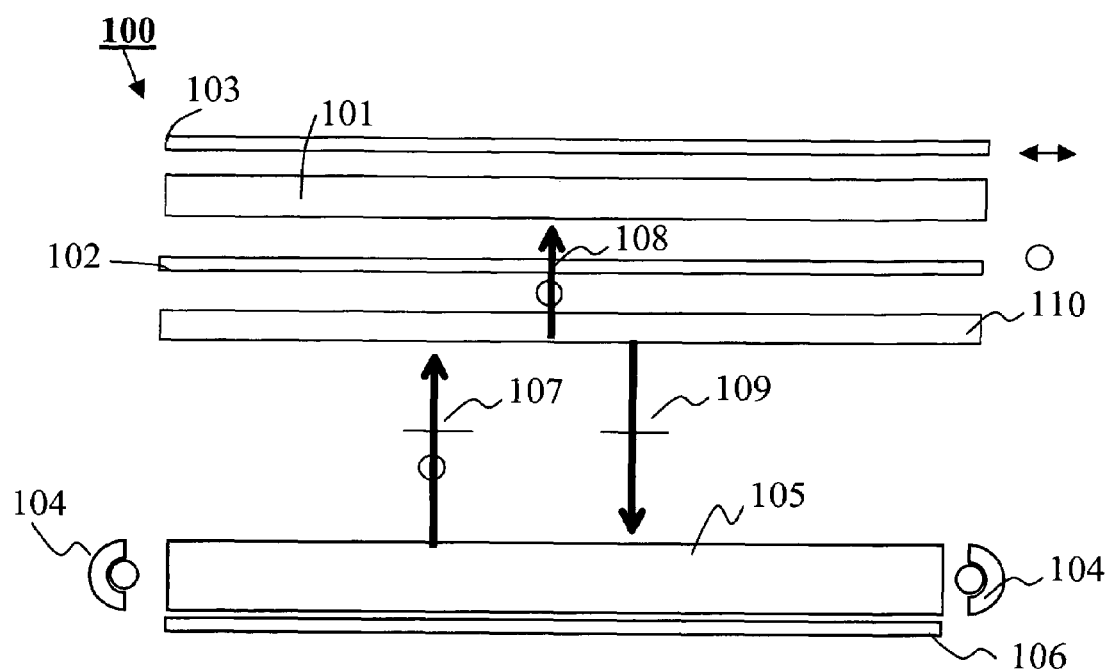
FIG. 1A is a cross-sectional view of a liquid crystal display device in accordance with an example embodiment.

FIG. 1A is a cross-sectional view of a light-valve imaging device 100 of an example embodiment. The imaging device 100 includes a transmissive light-valve 101, which is illustratively an LC panel. The imaging device 100 also includes a reflective polarizer 110, and a pair of absorptive polarizers 102 and 103. The polarizer 102 that is closer to the light guide 105 may be referred to as a rear polarizer. The imaging device may also include a one or more light management films including, but not limited to, brightness enhancement films and diffusers (not shown).

In operation, unpolarized light from a light source(s) 104 is provided through a light guide 105, which may have a diffusive reflector 106 disposed over one or more outer surfaces. As is readily appreciated by one of ordinary skill in the art, the light guide 105, the diffusive reflector 106 and the light management film(s) are useful in providing a uniform light distribution to the light valve 101, with an angular distribution of light that is designed to meet the angular field of view required by an end-user. For example, a laptop computer with a brightness enhancement layer has a viewing angle that is typically on the order of approximately ±20 degrees off-center axis. Further details of backlight assemblies and the components thereof are described in detail in U.S. patent application Ser. No. 10/857,515 entitled "Diffuse Reflector Films for Enhanced Liquid Crystal Display Efficiency" to X. Mi et al., filed May 28, 2004 and assigned to the present assignee. The disclosure of this application is specifically incorporated herein by reference.

Light 107 from the light guide 105 is incident on the reflective polarizer 110, which transmits light 108 of a first polarization state (perpendicular to the plane of the page) and reflects light 109 of a second polarization state (parallel to the plane of the page). In the present example embodiment, this light is incident on the light guide 105, and via the diffusive reflection layer 106 is converted to unpolarized light and reintroduced with light 107 to the device 100. In this manner, the light 109 may be reintroduced, or recycled, thereby providing an improved optical efficiency and improved optical performance through improved contrast and brightness.

As can be readily appreciated, the greater the amount of light 108 that is transmitted, the greater the optical efficiency. In accordance with example embodiments, an improvement in the transmission of the light 108 is effected by increasing the transmittance of the reflective polarizer 110 and thus reducing the amount of light that is lost. As will become clearer as the present description continues, this is realized via an improved reflective polarizer of example embodiments.

Figure 1B:
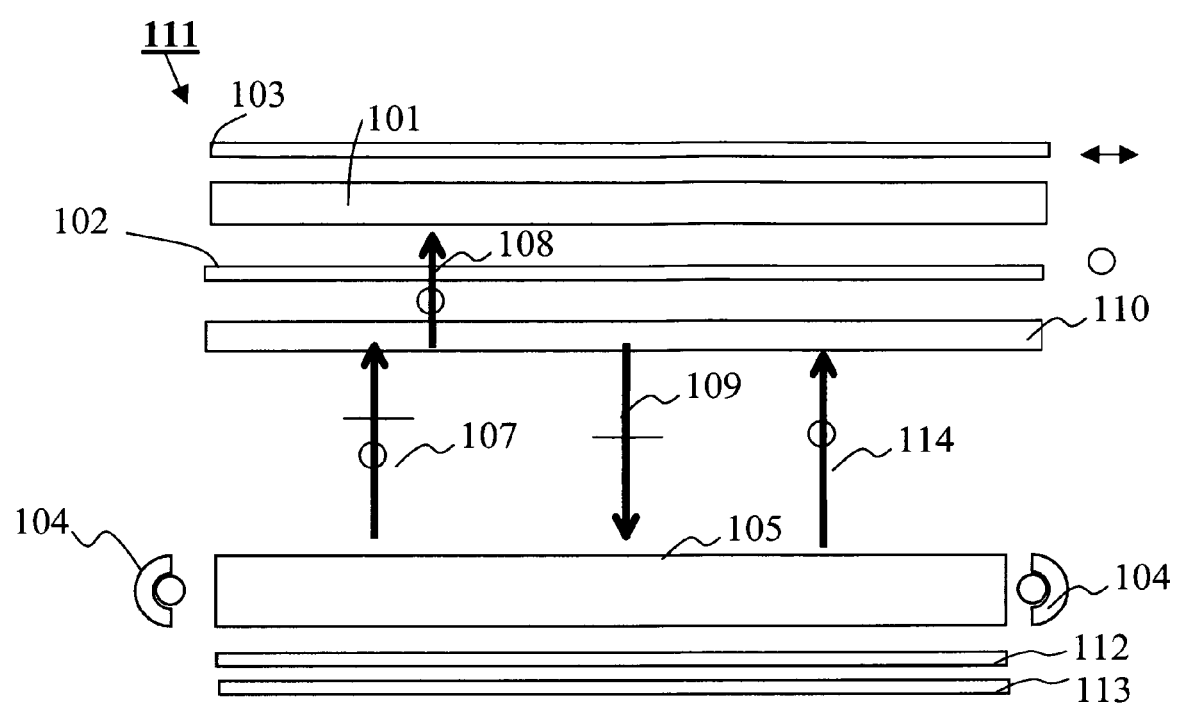
FIG. 1B is a cross-sectional view of a liquid crystal display device in accordance with an example embodiment.

FIG. 1B is a cross-sectional view of a light-valve imaging device 111 of another example embodiment. The device 111 of the present example embodiment includes many of the same features and elements of the example embodiment of FIG. 1A, and provides light recycling through polarization transformation of at least a portion of the light reflected from the reflective polarizer 110. In accordance with an example embodiment, the polarization transformation is carried out using a quarter wave retarder 112 and a reflective layer 113. Light 109 of the second polarization state is converted to light 114 of the first polarization state by the quarter wave retarder 112 and the reflective layer 113. As such, the required polarization conversion needed for light recycling is effected, and the light 114 is incident on the reflective polarizer in the desired polarization state.

Figure 2A:
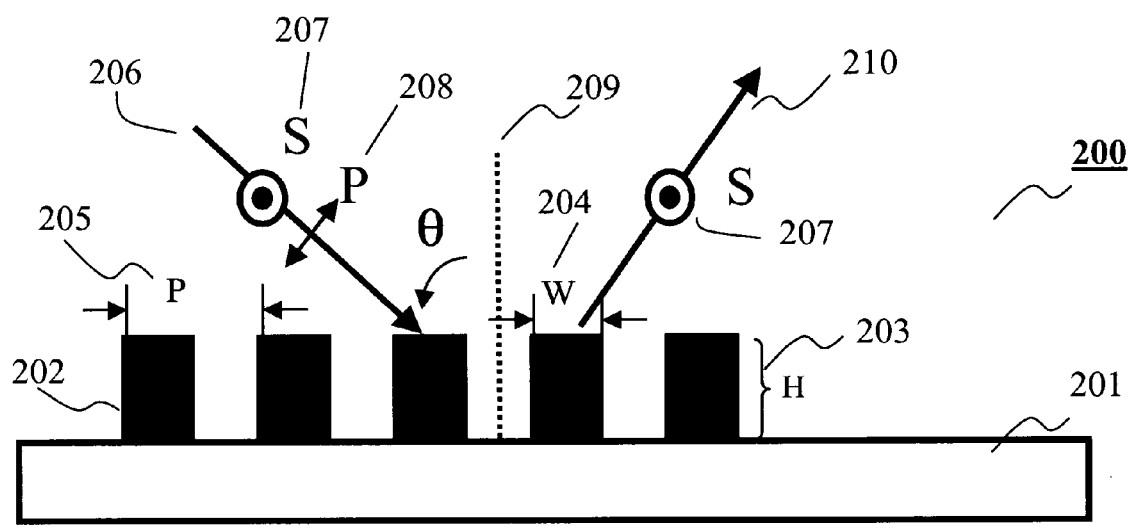
FIG. 2A is a cross-sectional view of a wire grid polarizer in accordance with an example embodiment.
Figure 2B:
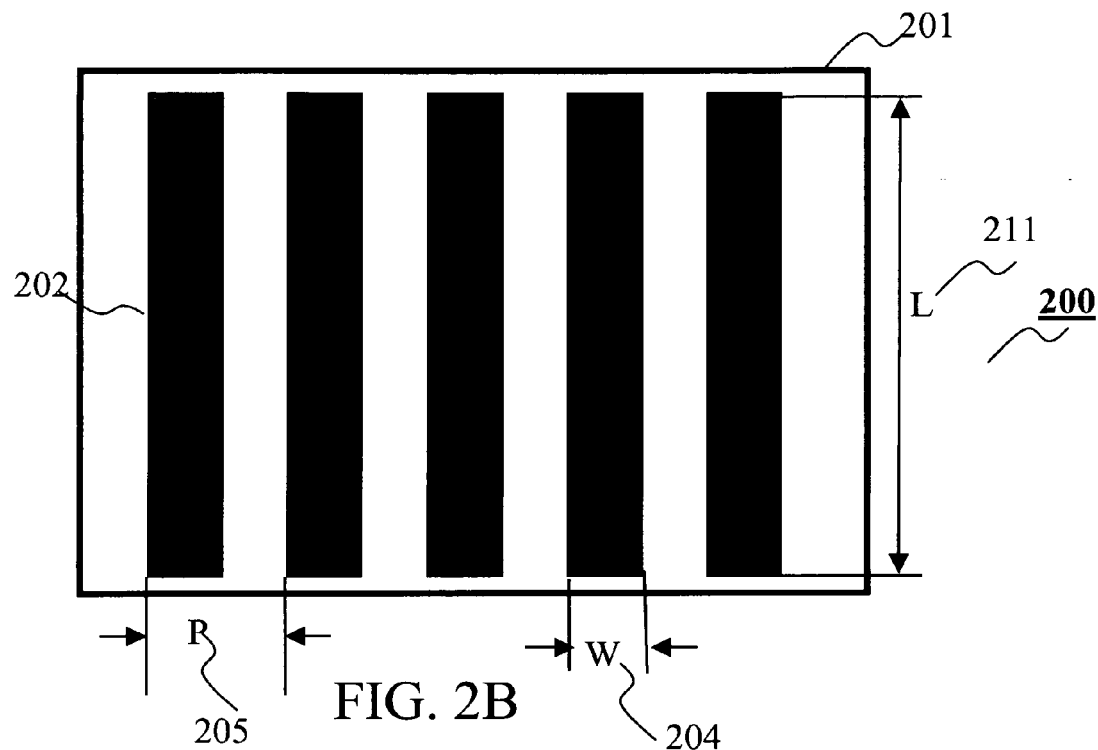
FIG. 2B is a top view of a wire grid polarizer in accordance with an example embodiment.

In accordance with an example embodiment, the reflective polarizer 110 is a wire grid polarizer that has an improved transmittance and a reduced loss when compared to known reflective polarizers, such as other wire grid polarizers. An illustrative wire grid polarizer 200 is shown in FIG. 2A and FIG. 2B. FIG. 2A is a cross sectional view and FIG. 2B is a top view of the polarizer 200.

The wire grid polarizer 200 of the example embodiment of FIG. 2A and FIG. 2B may be used as the reflective polarizer 110 in order to improve the optical efficiency through light recycling in LCD structures such as those of FIGS. 1A and 1B. The polarizer 200 includes a substrate 201 over which a plurality of conductors (e.g. wires) 202 are disposed. Each of the conductors 202 has a height (H) 203, a width (W) 204, a length (L) and a spacing, or pitch (P) 205, as shown. As will become clearer as the present description continues, controlling these parameters is useful in providing the polarizer 200 with an improved transmittance and a reduced loss compared to known device, thereby improving the light efficiency.

Figure 2C:
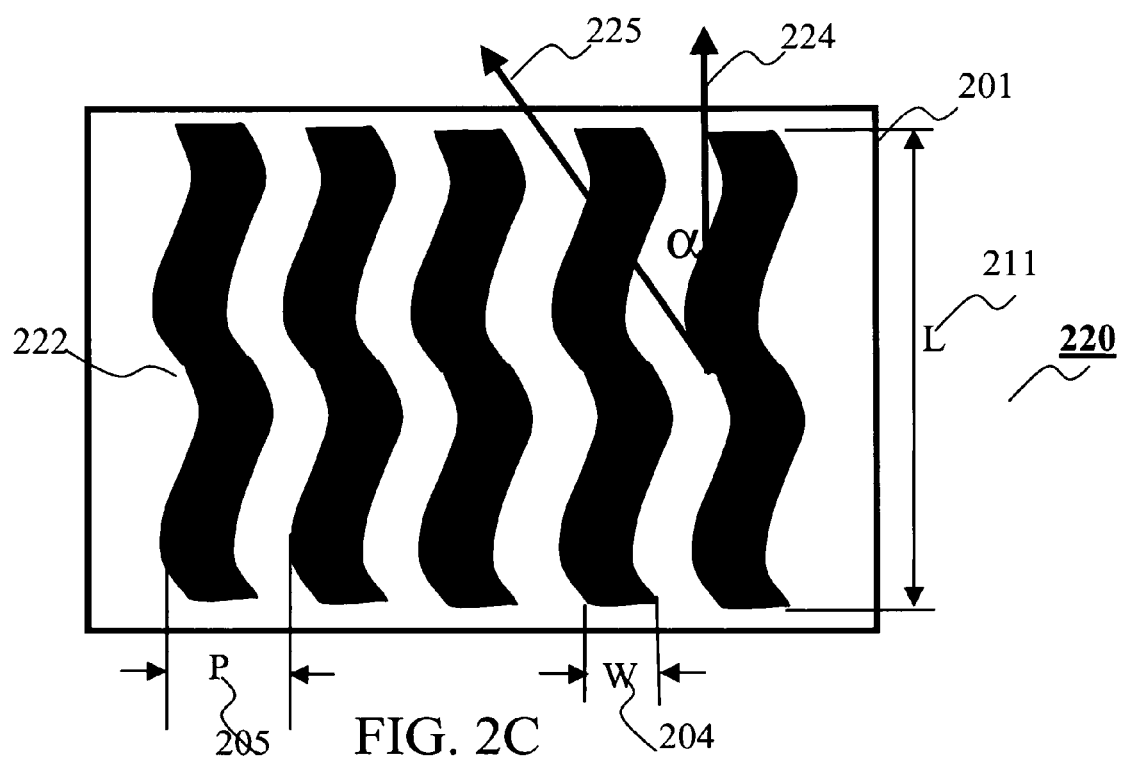
FIG. 2C is a top view of a wire grid polarizer showing parallel wires which are not straight according to another embodiment.

FIG. 2C shows a top view of yet another wire grid polarizer 220 where the wires 222 are parallel to each other but not straight. The wires (referred to as conductors as well) maintain a general direction 224 but at any point along the wires the tangent direction 225 is within an angle, α, of less then approximately 10 degrees or less relative to the general direction 224. In fact the angle, α, may be 5 degrees or less. This relatively small deviation of the wires from being substantially 'straight' in the wire grid polarizer can increase tolerance of alignment of the wire grids relative to the rear polarizer transmission axis, and yet this angle, α, will not significantly affect the performance of the wire grid polarizer 220 in terms of transmittance and reflectance.

Figure 2D:
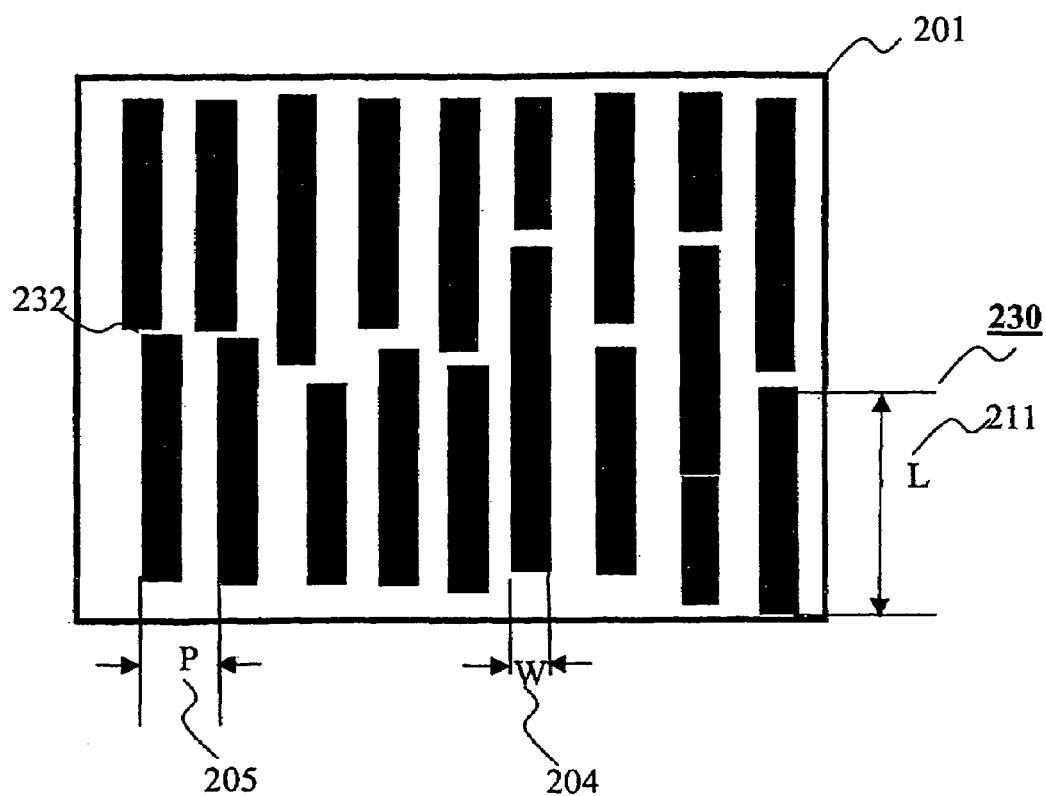
FIG. 2D is a top view of a wire grid polarizer showing parallel wires of finite length L arranged randomly according to another embodiment of the wire grid polarizer.

FIG. 2D shows yet another illustrative embodiment. In this example embodiment, the polarizer 230 has wires 232 that are substantially parallel to each other with average pitch $P_{av}$ and they have an average finite length $L_{av}$ which is greater than approximately 10 times an average width $W_{av}$ of the wires (aspect ratio). Having a collection of relatively shorter wires of the embodiment of FIG. 2D as opposed to the relatively longer wires of FIG. 2B will be beneficial in manufacturing because shorter wires can form as nano-metal wires or nanotubes with techniques known in the art.

In accordance with an example embodiment, the substrate 201 may be glass, polymer, or crystalline material that is transparent to the light at the chosen wavelength or wavelength range and provides good adhesion to the conductors 202. The substrate may or may not be diffusive to light. The conductors 202 are usefully aluminum or other suitable conductors such as copper, gold, and silver. Typically the more conductive the material chosen for the conductor 202 is in the targeted wavelength range, the better the wire grid polarizer's performance. For example, a good choice for the conductive material is aluminum, as it provides for a broadband reflective polarizer substantially covering the full visible spectrum.

Furthermore, the polarizer 200 may be fabricated using known fabrication techniques. These fabrication techniques include lithography and etching and electron beam etching techniques, to name only a few. It is noted that the fabrication technique chosen must afford the feature sizes, pitch and uniformity discussed below.

A variety of well-known techniques can be used to fabricate the reflective polarizer device, and the choice of fabrication techniques is not critical to the invention as long as the appropriate specifications for the surface texture are met. One method involves depositing and patterning a film of aluminum or silver directly onto a textured substrate. A variety of deposition and patterning techniques common to the semiconductor industry could be used to form a well-defined pattern over the textured surface so long as the method provides a sufficient depth of field. Holographic lithography, as described by Garvin in U.S. Pat. No. 4,049,944, or by Ferranti in U.S. Pat. No. 4,514,479 is a method that offers sufficient resolution and depth of field.

The desired surface texture of the underlying substrate 201 may be effected by mechanical abrasion of the substrate, such as grinding or sand-blasting or by chemical abrasion of the substrate, such as the well known use of dilute hydrofluoric acid to etch glass. Alternatively, a deformable material could be deposited on the substrate and then textured by embossing or by radiation assisted casting, as described by Shvartsman in U.S. Pat. No. 5,279,689. In still another method, the textured surface could be embossed or cast onto a continuous plastic film (for example, using the method described by Blenkhorn in U.S. Pat. No. 4,840,757) that may then be laminated to a rigid substrate.

Still another method for fabricating the diffuse reflective polarizer is to deposit and pattern the grid of parallel conductors on a smooth surface comprised of a polymer film over a rigid substrate, and then emboss the surface texture using the method described by Sager in U.S. Pat. No. 5,466,319. Other combinations of fabrication techniques are surely possible within the scope of the example embodiments. It is noted that the U.S. patents referenced in connection with the illustrative fabrication techniques are hereby incorporated herein by reference.

The wire grid polarizer 200 provides separation of orthogonally polarized states of light incident thereon. For example, light 206 having orthogonal polarization components in first and second polarization states 207 and 208, respectively, is incident at an angle of incidence ($\theta$) (often referred to as the polar angle) with respect to the normal 209 to the plane of the polarizer 200. Illustratively, the first polarization state 207 is S-polarized light, which is perpendicular to the plane of the page; and the second polarization state is P-polarized light, which is parallel to the plane of the page.

Through the function of the polarizer 200, light 210 of the first polarization state (S-polarization) 207 is reflected from the polarizer 200 and light 211 of the second polarization state (P-polarization) 208 is transmitted through the polarizer. It is further noted that in certain example embodiments the viewing angle may be also measured from a normal to the display surface and thus the wire grid polarizer. It is noted that in some consumer applications, the viewing angle is on the order of approximately +20 degrees to approximately ±60 degrees. As such, it is useful to optimize the light output within this angular range.

In certain display applications, it is useful to optimize the amount of light that is incident on the light valve (e.g., light valve 101) and thus to the end-user. As referenced previously, this is effected in example embodiments by increasing the amount of light 211 that is transmitted and by minimizing the loss of light energy that occurs during the polarization separation process of the polarizer 200. In certain illustrative embodiments, this may be effected by providing a duty cycle or fill factor that lies within a certain range. Illustratively, this is effected by determining a value of the pitch 205, P, and varying the width 204, W, to realize the desired duty cycle, W/P. This term (W/P) is often referred to as the fill-factor.

As will be appreciated by one of ordinary skill in the art, the width, W, of the conductors 202 directly impacts the reflection and absorption of light energy of the incident light 206. To this end, the greater the width 204, the greater the amount of S-polarized light that is reflected and the greater the amount of light energy that is absorbed by the conductive material of the polarizer 200. However, the greater the width 204, the less the amount of P-polarized light that is transmitted. As such, and as will become clearer as the present description continues, to the extent possible, it is useful to choose a proper figure of merit by varying the ratio of the width to pitch of the conductor elements.

In other example embodiments, a comparatively improved total light throughput is realized by providing a ratio of the height 203, H, to the pitch 205, P, within a certain range. To wit, the greater the height 203, the greater the amount of S-polarized light that is reflected. However, the greater the height 203, the less the amount of P-polarized light that is transmitted. As such, it is also useful, to choose a proper figure of merit by varying the ratio of width to pitch.

By providing a certain fill factor, or by providing a certain ratio of the height 203 to the pitch 205 (H/P), or both, the wire grid polarizer provides an improved total light throughput and a reduced loss of light energy. It is noted that the improved light throughput of the example embodiments is effected with an extinction ratio (e.g., $T_p/T_s$ where $T_p$ and $T_s$ are the transmittance of S-polarized and P-polarized light, respectively) that is significantly less than known wire grid polarizers. To this end, in known wire grid polarizers it is desired to provide an extinction ratio of 100 or 500 or even 1000. Extinction ratios of this magnitude are desired in many applications in order to improve the contrast ratio of the system. In order to achieve these relatively high extinction ratios, it is necessary to provide a wire grid polarizer that has conductors with dimensional widths and heights that can result in unacceptable reflection and absorption. As such, known wire grid polarizers are not efficient in applications where light recycling is desired.

In accordance with an example embodiment the extinction ratio is on the order of approximately 5:1 to approximately 20:1. These relatively low values notwithstanding, the contrast ratios realized using the wire grid polarizer of example embodiments in systems such as those of the example embodiments of FIGS. 1A and 1B are well within acceptable performance values. In fact, applicants have found that in systems such as those of FIGS. 1A and 1B, extinction ratios of greater than approximately 10:1 provide no appreciable gain relative to the use of reflective polarizers with much higher extinction ratios. To this end, applicants note that in example embodiments the reflective polarizer 110, 200, utilized as a polarization recycling device, and the polarizers 102, 103 of high extinction ratio, determine the display contrast of the light valve imaging devices 100 and 111.

In example embodiments it is useful to substantially optimize the total light throughput that is a combination of the transmitted light $T_p$ 211 of the second polarization state and the reflected light $R_s$ of the first polarization state 210. This combination fosters an improved optical efficiency in systems such as those of the example embodiments of FIGS. 1A and 1B. These aspects of the example embodiments are described presently.

In accordance with certain example embodiments, the wire grid polarizer 110, 200 is used as a polarization recycling device, and via a rather straight-forward analysis, the total light throughput, T1, that is transmitted through the wire grid polarizer and in the transmission axis of the rear polarizer 102 is given by:

$$T1 = \frac{0.5 T_p}{1 - 0.5(R_s + R_p)R} \qquad \text{Eqn. 1}$$

-continued $$\text{or } T1 = \frac{0.5T_p}{1 - 0.5R_s R} \text{(when } R_p << R_s\text{)} \quad \text{Eqn. 2}$$

Eqns. 1 and 2 apply to systems of the example embodiments where the recycling is effected using a diffusive reflector such as reflective layer 106. It is noted that R accounts for the reflectivity of the recycling reflective film, or the efficiency associated with each light recycling. In an ideal case, R is equal to 1, which means that there is no light loss in the light recycling. When R is less than 1, there is some light loss in the light recycling path. It is also noted that T1 is also referred to as the figure of merit for such diffusive reflector-based recycling systems.

In systems that incorporate a reflector and a quarter-wave retarder to effect desired light recycling, the figure of merit is given by the total light, T2, which is transmitted through the wire grid polarizer and in the transmission axis of the rear polarizer 102:

$$T2 = 0.5T_p(1 + RR_s) \quad \text{Eqn. 3}$$

Again, R is the efficiency associated with each light recycling.

In keeping with the example embodiments, regardless of the type of recycling used, it is beneficial to optimize the figure of merit for the respective system in order to improve the amount of light (brightness) of the image formed via the displays of the example embodiments.

In general, six parameters (Ts, Tp, Rs, Rp, As, Ap) are required to describe the optical properties of a wire grid polarizer at a given angle of incidence, where Ts, Rs, As are the Transmittance, Reflectance, and Absorbance of the S-polarized light, respectively, and Tp, Rp, Ap are the Transmittance, Reflectance, and Absorbance of the P-polarization, respectively. They satisfy Ts+Rs+As=1 and Tp+Rp+Ap=1. Therefore, there are 4 independent parameters.

Equations 1 through 3 indicate that the two parameters $T_p$ and $R_s$ are particularly important for polarization recycling. Both $T_p$ and $R_s$ can be controlled by the duty cycle (W/P).

In general, a high duty cycle wire grid polarizer produces a high reflectance $R_s$ and a low transmittance $T_p$, and a low duty cycle wire grid polarizer produces a low reflectance $R_s$ and a high transmittance $T_p$. As suggested by U.S. Pat. No. 6,108,131 to Hansen et al., when the total efficiency is defined as the sum of $R_s$ and $T_p$, known wire grid polarizers are likely to have a duty cycle (ratio of elements width to pitch) in a range of 0.40 to 0.60. However, as discussed, in connection with the example embodiments the figure of merit for the polarization recycling is given by either equation 1, equation 2, or equation 3 and not by the sum of $R_s$ and $T_p$. Applicants have discovered that the figure of merit function of the example embodiment actually provides a duty cycle of the wire grid polarizer for polarization recycle that is quite different from the duty cycle of known wire grid polarizers having a duty cycle in the range of 0.40 to 0.60. To wit, and as will become clearer from the following description, the duty cycle of wire grid polarizers of the example embodiments is in the range of approximately 0.18 to approximately 0.25.

In the example embodiments, the improved total light throughput (T1 or T2) due to the improved transmittance $T_p$, at the expense of the reflectance $R_s$, is realized by providing a comparatively reduced width 204, or height 203, or both.

In order to further illustrate the example embodiments, the following graphical representations are described. It is noted that these graphical representations are illustrative of the benefits provided by the example embodiments, and are not intended to be limiting.

Figure 3A:
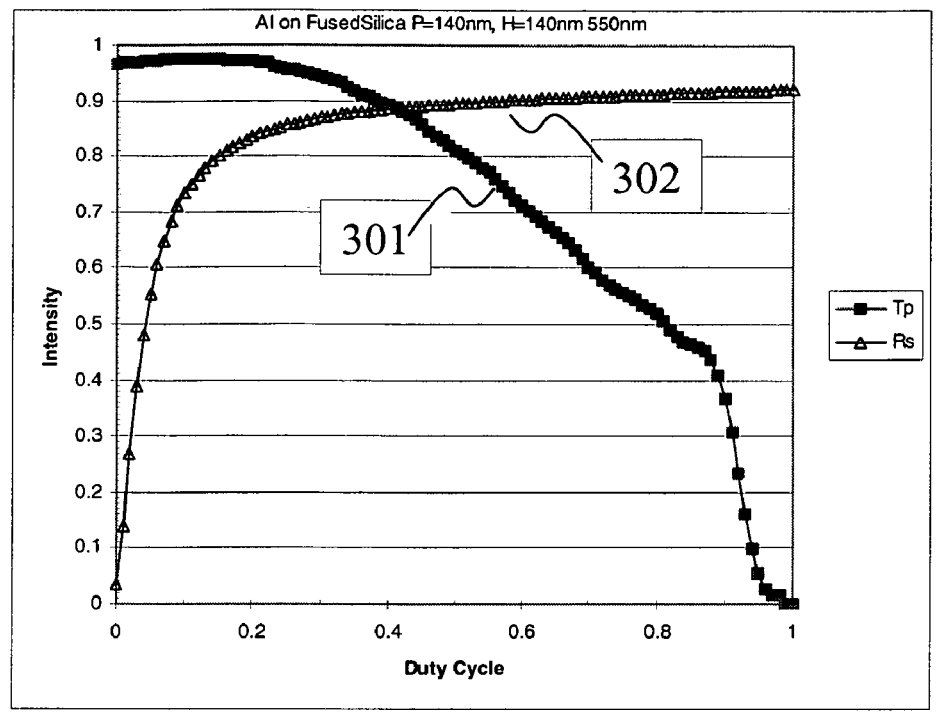
FIGS. 3A and 3B are graphical representations showing the transmitted intensity of light of a first polarization state and the reflected polarization state of light of a second polarization state versus the duty cycle of wire grid polarizers in accordance with an example embodiment.
Figure 3B:
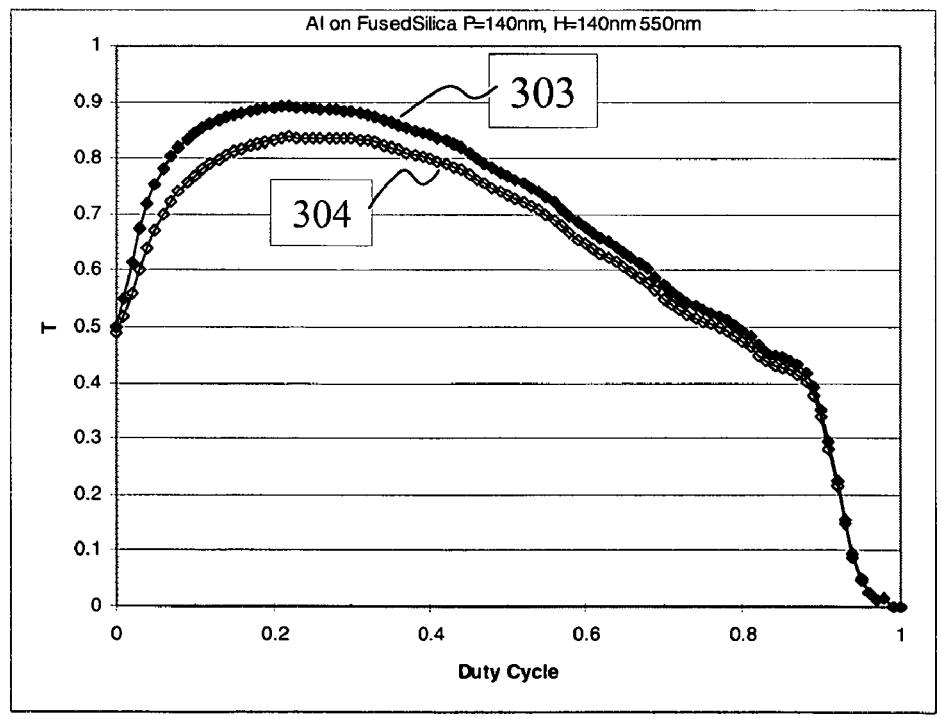

FIG. 3A is a graph of the intensity versus the duty cycle for a wire grid polarizer of an example embodiment. The wire grid polarizer may be of the type described in connection with FIG. 2, for example, and having aluminum conductors 202 disposed over a fused silica substrate 201. The data of the graph of FIGS. 3A and 3B are from such a structure having a pitch of 140 nm, a height of 140 nm, normal incident light having a wavelength of 550 nm. By variation of the width, the duty cycle is varied. The curve 301 shows the transmittance of P-polarization state light, while the curve 302 shows the reflectance of S-polarization state light.

As can be readily appreciated, the transmittance $T_p$ decreases with the duty cycle, and the reflectance $R_s$ increases with the duty cycle. When the duty cycle is low, for example approaching approximately 0.0, the transmittance $T_p$ is approximately 97%; however, the reflectance $R_s$ is too low, only about 3%. At the opposite extreme, when the duty cycle is high, for example approaching approximately 1.00, the reflectance $R_s$ is high, close to 92%, but the transmittance $T_p$ is nearly 0%. Under either extreme case, the wire grid polarizer is not efficient in polarization recycling. Thus, a tradeoff must be made between the transmittance $T_p$ and the reflectance $R_s$ to maximize the total light throughput, such as described by equation 1 or equation 3, by varying the ratio of the width to pitch, and the ratio of the height to pitch.

FIG. 3B is a graph of the merit functions versus the duty cycle in accordance with example embodiments. The data depicted in the graph of 3B are from the wire grid polarizer described in connection with the example embodiments of FIG. 3A. Curve 303 shows the merit function (T2) versus duty cycle for the wire grid polarizer disposed in a display system that effects polarization recycling via a quarter wave retarder and a reflecting elements, such as the system of the example embodiment of FIG. 1B. Curve 304 shows the merit function (T1) versus duty cycle for a wire grid polarizer implemented in a display system that provides light recycling using a diffusive reflector, such as the system of the example embodiment of FIG. 1A.

As can be readily appreciated from a review of both curves 303 and 304, the function of merit is substantially optimal at a duty cycle of approximately 0.18 to approximately 0.25, with a peak value at approximately 0.22 for each system. Thus, the total light output of a display including a wire grid polarizer and a light recycling by diffusion reflection of light of one polarization state or by polarization transformation and reflection, is optimal if the wire grid polarizer has a duty cycle of approximately 0.18 to approximately 0.25. This is contrasted with the figures of merit for known devices having duty cycles of range of 0.40 to 0.60. As can be appreciated the figures of merit for these known wire grid polarizers, which are not useful for recycling, are significantly lower than the figures of merit (T1, T2) of the wire grid polarizer of the example embodiments.

Figure 4A:
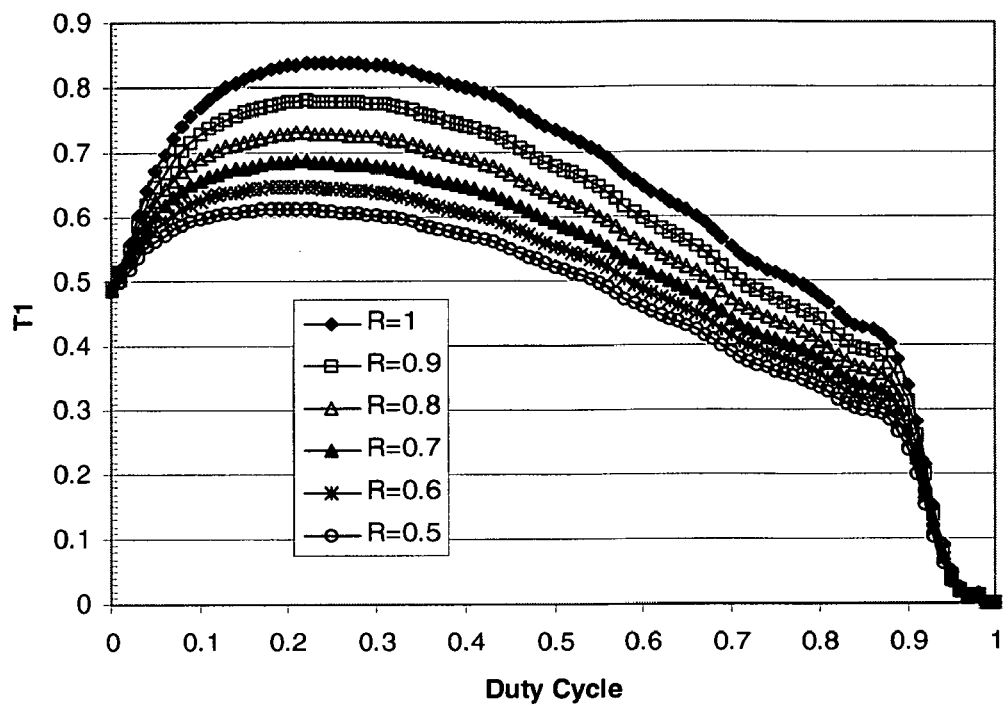
FIGS. 4A and 4B are graphical representations showing the transmitted intensity versus duty cycle of wire grid polarizers in accordance with an example embodiment.
Figure 4B:
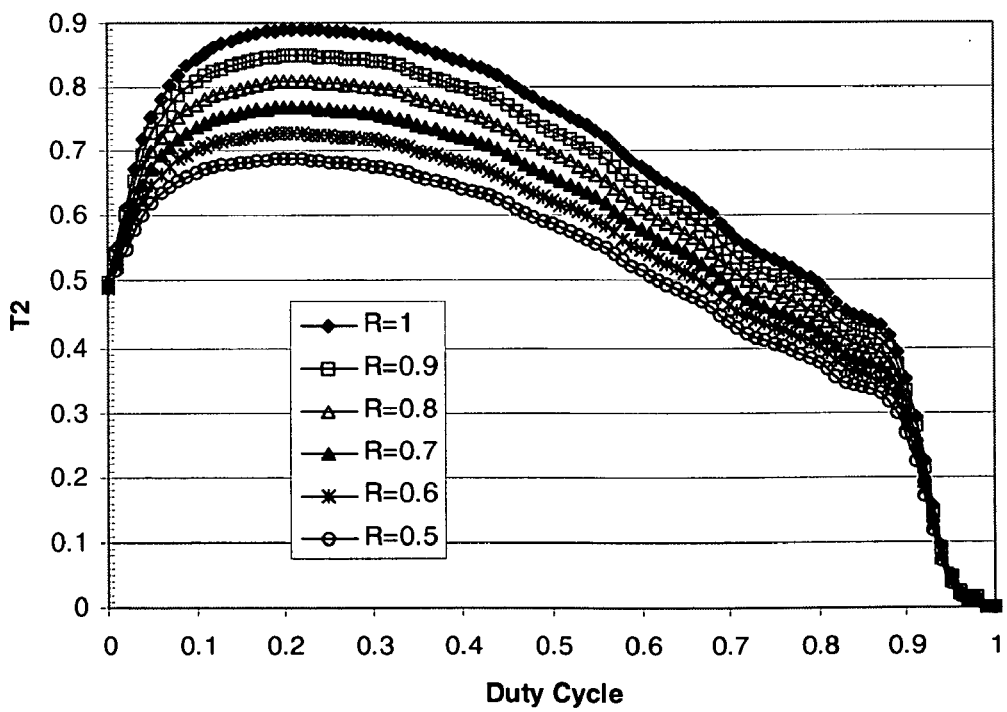

FIGS. 4A and 4B show graphically T1 and T2 vs. duty cycle with R varying from approximately 0.5 (50%) to approximately 1.0 (100%). The data are computed from a wire grid structure as described in connection with an example embodiment having a pitch of approximately 140.0 nm, a height of approximately 140.0 nm, and normally incident light having a wavelength of approximately 550 nm. It can be seen that the greater the value of R, the better are T1 and T2. However, regardless of the value of R, the best values of T1 and T2 occur when the duty cycle is in approximately the range of approximately 0.18 to approximately 0.25. In other words, R does not significantly impact the dependence of T1 and T2 on the duty cycle. For simplicity, R is chosen to be 1 in the following discussion.

In the preceding examples, R has been assumed to be 1 for simplified discussion. In the event that R is smaller than 1, $R_s$ can be rescaled smaller to account for the impact of R. In the examples, T1 and T2 are beneficially improved, which clearly requires the improvement of the combination of the transmittance of the P-polarization ($T_p$) and the reflectance of the S-polarization ($R_s$). To this end, and as can be readily appreciated, the greater the transmittance of the P-polarization ($T_p$) and the greater the reflectance of the S-polarization ($R_s$), the higher the total throughput is.

The data shown in FIGS. 3A, 3B and 4A through 4B, are for normally incident light. In practice light comes from all directions in a given viewing cone. In this case, the total light throughput T1 and T2 are average values over the usable viewing cone. Nonetheless, applicants have discovered that although the absolute values of T1 and T2 may vary, the maximum total light throughput still is achieved with wire grid polarizer of example embodiments having a duty cycle of approximately 0.18 to approximately 0.25.

Figure 5A:
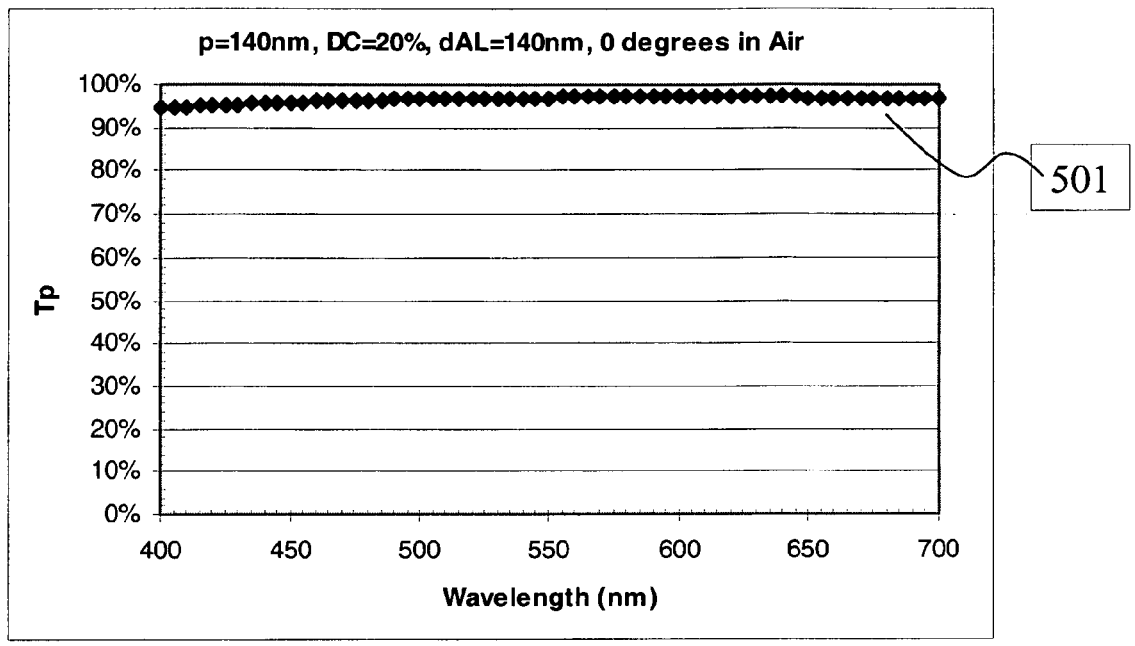
FIG. 5A is a graphical representation showing the transmittance of polarized light versus wavelength of a wire grid polarizer in accordance with an example embodiment.
Figure 5B:
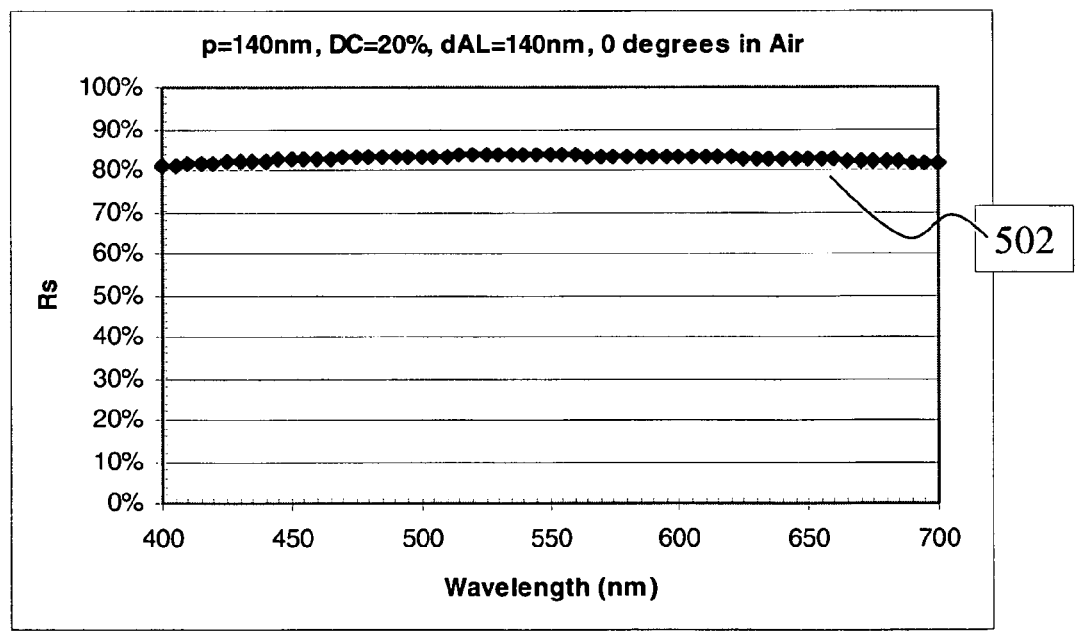
FIG. 5B is a graphical representation showing the reflectance of polarized light versus wavelength of a wire grid polarizer in accordance with an example embodiment.

FIGS. 5A and 5B are graphical representations of the transmittance $T_p$ (%) and reflectance $R_s$, respectively, as a function of incident wavelength for a wire grid polarizer according to example embodiments. In the present example embodiment, the wire grid polarizer has a pitch of approximately 140 nm and a duty cycle of approximately 0.20. The curve 501 shows that the transmittance of the light of the transmitted P-polarization state is substantially maintained across the entire wavelength range. Similarly, the reflectance of the light of the reflected polarization state (s-polarization state) is shown by curve 502 and is substantially independent of the wavelength. Such performance is required in color display applications.

Figure 6A:
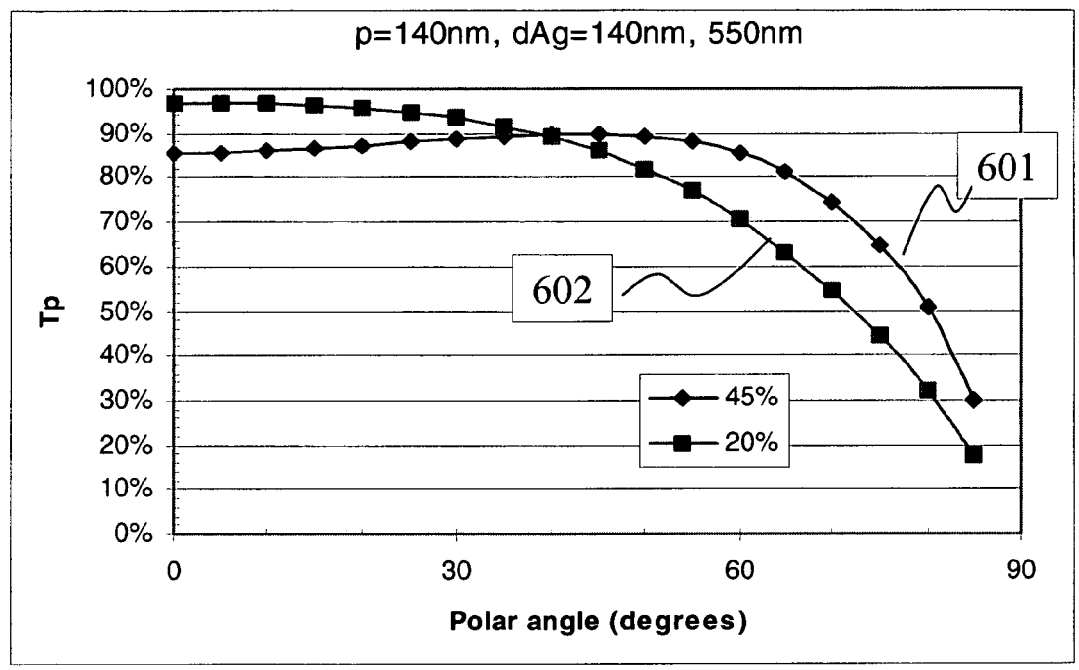
FIG. 6A is a graphical representation showing the transmittance of polarized light versus angle of incidence (from the normal to the plane of the polarizer) of a wire grid polarizer in accordance with an example embodiment.
Figure 6B:
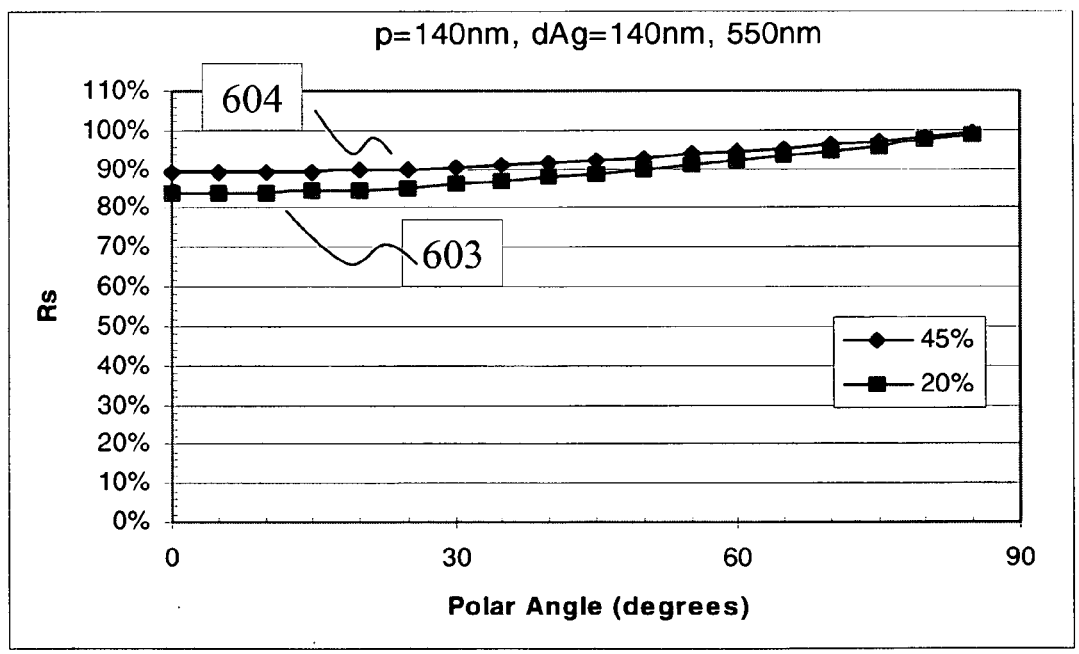
FIG. 6B is a graphical representation showing the reflectance of polarized light versus angle of incidence (from the normal to the plane of the polarizer) of a wire grid polarizer in accordance with an example embodiment.

As referenced previously, the angle of incidence to the polarizer may impact the light output of the wire grid polarizer. FIGS. 6A and 6B show the transmittance $T_p$ (%) of the light of the transmitted polarization state and the reflectance $R_s$ (%) of the reflected polarization state, respectively, versus the angle of incidence (θ) of wire grid polarizers.

Curve 601 is the transmittance versus θ for a wire grid polarizer having a duty cycle of 0.45, whereas the curve 602 is the transmittance for a wire grid polarizer of an example embodiment having a duty cycle of 0.20.

For an angle of incidence between approximately 0 degrees and 60 degrees, the transmittance is substantially the same for the wire grid polarizer of an example embodiment having a duty cycle of approximately 0.20.

Similarly, and as shown by curve 603 in FIG. 6B over the range of angles of incidence, the wire grid polarizer having a duty cycle of 0.20 in keeping with an illustrative embodiment provided a nearly constant reflectance. This is compared to the reflectance shown by curve 604, which is of a wire grid polarizer having a duty cycle of 0.45.

FIGS. 6A and 6B also show the tradeoff between the transmittance $T_p$ and reflectance $R_s$ needed to meet the desired performance in light recycling applications. The wire grid polarizer having a duty cycle of approximately 0.20 has a much higher transmittance $T_p$ (approximately 97% at normal incidence or approximately 0 degree polar angle) than the one with a duty cycle of 0.45 (approximately 85% at normal incidence), though the wire grid polarizer having a duty cycle of 0.2 has a lower reflectance $R_s$ (about 84%) than the one with a duty cycle of 0.45 (about 88% at normal incidence). Overall the total light throughput based upon Eqns. 1, 2 or 3 is higher for the wire grid polarizer with a duty cycle of 0.2 than the one with a duty cycle of 0.45, as discussed referring to FIG. 4.

Figure 7A:
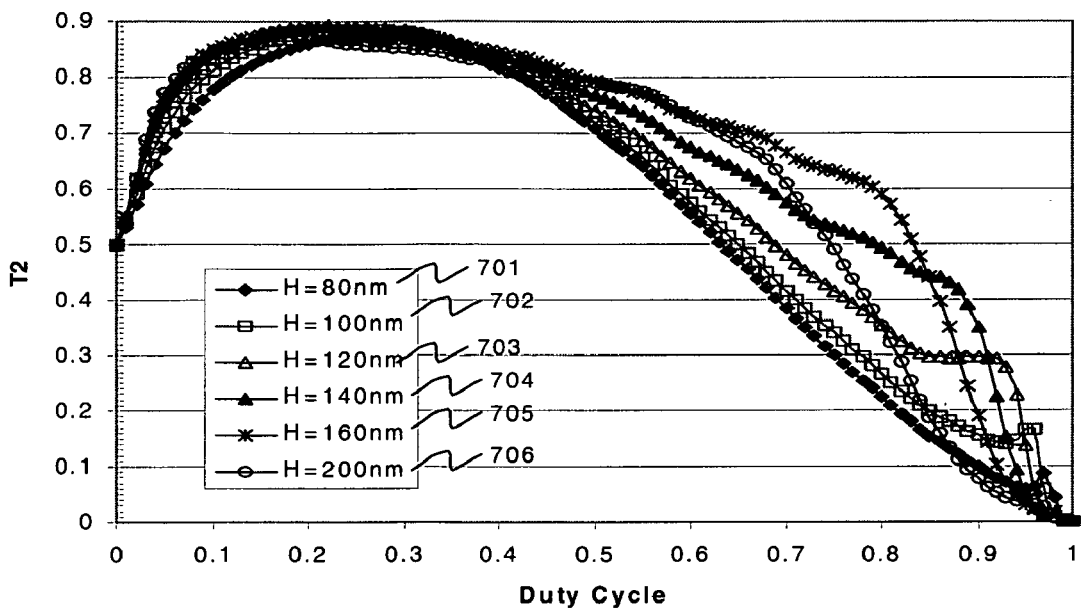
FIG. 7A is a graphical representation showing a function of merit of a display system including a quarter-wave retarder and a reflector versus the duty cycle of a wire grid polarizer in accordance with an example embodiment.
Figure 7B:
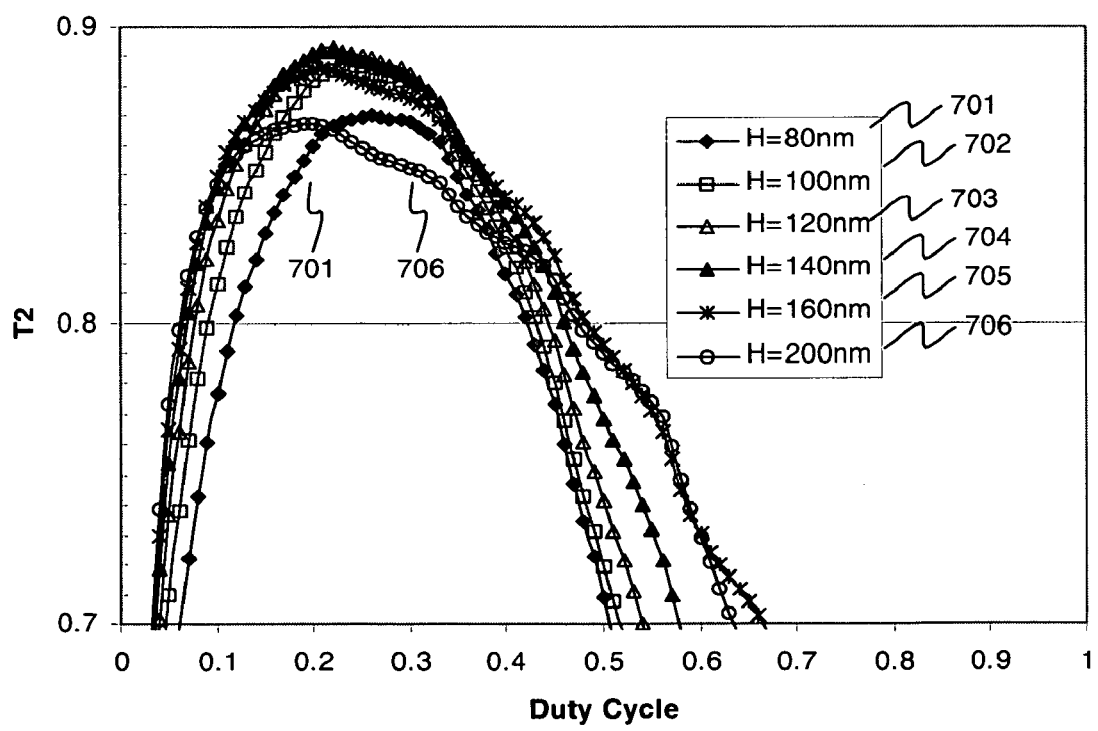
FIG. 7B is an exploded view of FIG. 7A.
Figure 7C:
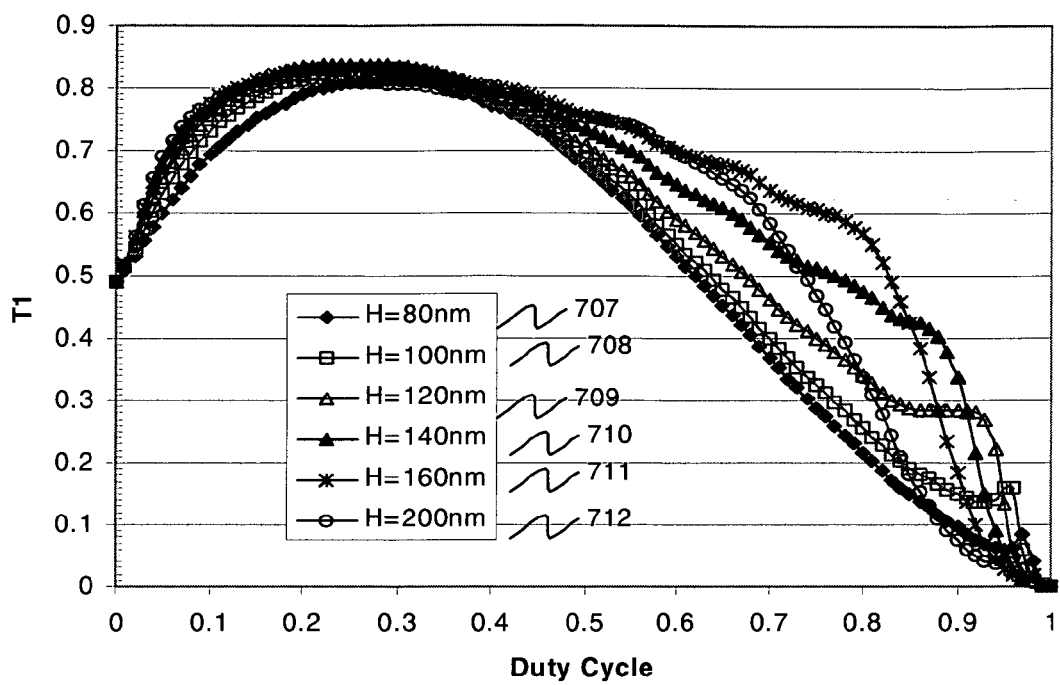
FIG. 7C is a graphical representation showing the function of merit of a system including a diffusive reflector versus the duty cycle of a wire grid polarizer in accordance with an example embodiment.

FIGS. 7A and 7C are graphical representations of the merit function versus the duty cycle for a display device incorporating a quarter wave retarder (i.e., T2) and a reflector for recycling and a display device incorporating a diffusive reflector for recycling (i.e., T1), respectively. In the example embodiment, the duty cycle of the wire grid polarizers are in the range of approximately 0.0 to approximately 1.0. In the wire grid polarizers of the example embodiments of FIGS. 7A and 7C, the incident light has a wavelength of approximately 550 nm, the pitch is approximately 140 nm, and a number of wire grid polarizers having conductors of a variety of heights are used. To wit, the curves 701 through 712 represent the total light throughput of each of a variety of wire grid polarizers having the same pitch but varying duty cycle and having conductor heights (H) ranging from approximately 80 nm to approximately 200 nm. As such, FIGS. 7A and 7C provide data of the effect of conductor height on the total transmittance over a range of duty cycles for each type of recycling system.

As can be readily appreciated from a review of FIGS. 7A and 7C, regardless of the height of the conductors, the best total light throughput (figure of merit) for either recycling structure occurs in wire grid polarizers having a duty cycle in the range of 0.18 to approximately 0.25.

Figure 7D:
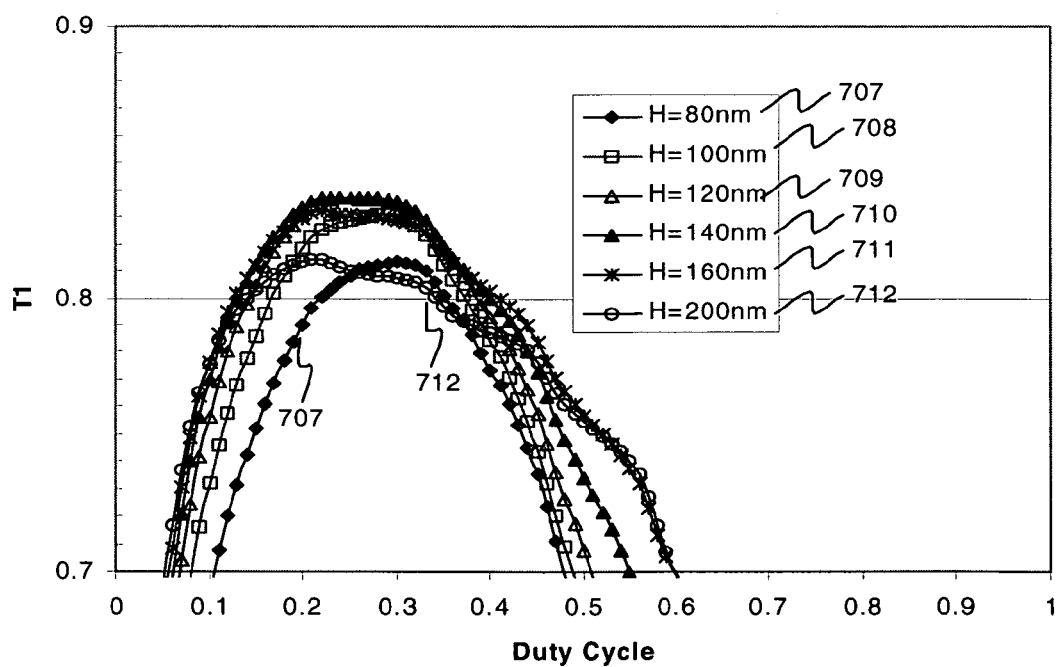
FIG. 7D is an exploded view of FIG. 7C.

FIGS. 7B and 7D are exploded views of FIGS. 7A and 7C, respectively, for better view of the maximum total light throughput. When the height is in the range of approximately 80 nm to approximately 200 nm, or the ratio of height to pitch is in the range approximately of 0.57 to approximately 1.43, the total light throughput is at a maximum level achieved according to the parameters of the present example embodiment. When the height is greater than approximately 200 nm, or less than approximately 80 nm, the total transmittance is reduced. This is indicated by the total light throughput T1 or T2 at approximately 200 nm as shown by curve 706 in FIG. 7B and curve 712 in FIG. 7D; and approximately 80 nm as shown by curve 701 in FIG. 7B and curve 707 in FIG. 7D, which are lower than T1, or T2 when the height is approximately 100 nm, approximately 120 nm, approximately 140 nm, or approximately 160 nm.

Figure 8:
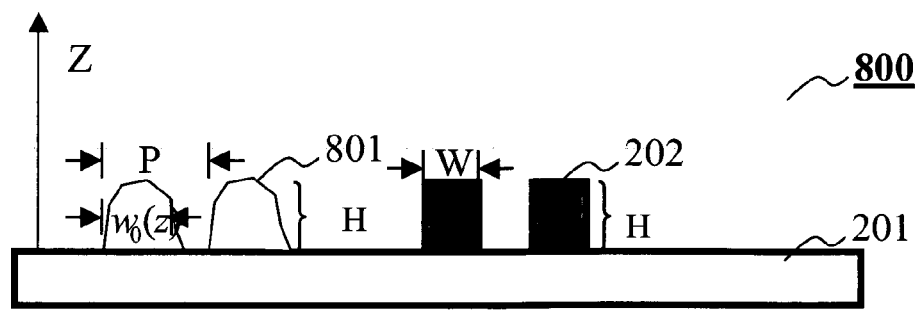
FIG. 8 is a cross-sectional view of a wire grid polarizer in accordance with an example embodiment.

FIG. 8 shows a wire grid polarizer 800 in accordance with an example embodiment. The wire grid polarizer 800 shows the conductors 202 that are substantially rectangular in cross-section, as well as conductors 801 that have imperfections due to manufacturing. As can be appreciated, these imperfections can create variances in the height, width and pitch of the wire grid polarizer 800. Given these imperfections, the fill factor at each height z may be expressed as:

$$f_0(z) \equiv \frac{w_0(z)}{P} \qquad \text{Eqn. 3}$$

where $w_0$ (z) is the width of the wires at height z.

The average fill factor over the entire height H is given by:

$$F \equiv \frac{1}{H}\int_0^H f_0(z) = \frac{1}{H}\int_0^H \frac{w_0(z)}{P} = \frac{1}{H \cdot P}\int_0^H w_0(z) = \frac{S}{H \cdot P} \qquad \text{Eqn. 4}$$

where $$S \equiv \int_0^H w_0(z),$$

which is the area under the surface profile of the wire. From these expressions, the average width $$W_{av} \equiv \frac{S}{H}, \text{ or } W_{av} \equiv F \cdot P.$$

These are useful in determining the parameters for a wire grid polarizer having an average duty cycle in the range of approximately 0.18 to approximately 0.25.

Figure 9:
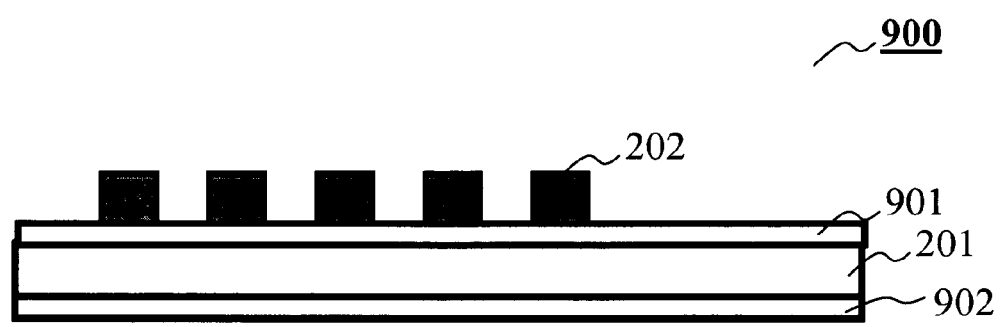
FIG. 9 is a cross sectional view of a wire-grid polarizer in accordance with an example embodiment.

Finally, it is noted that certain improvement in the light efficiency is realized through the improved light recycling afforded by the wire grid polarizers of the example embodiments. In keeping with the example embodiments, the display devices of the example embodiments of FIGS. 1A and 1B realize an overall improvement in the light efficiency of approximately 10%. Moreover, an additional improvement in light efficiency of approximately 4% to approximately 5% can be achieved by incorporating antireflection layer 901. One example embodiment is shown in FIG. 9, where antireflection layers 901, 902 are disposed on either side of the substrate 201 of the wire grid polarizer 900 which further increases the transmittance $T_p$ of the light of P-polarization from 97% to up to 100% with little loss in reflectance $R_s$. This example embodiment is shown in FIG. 9.

Figure 10:
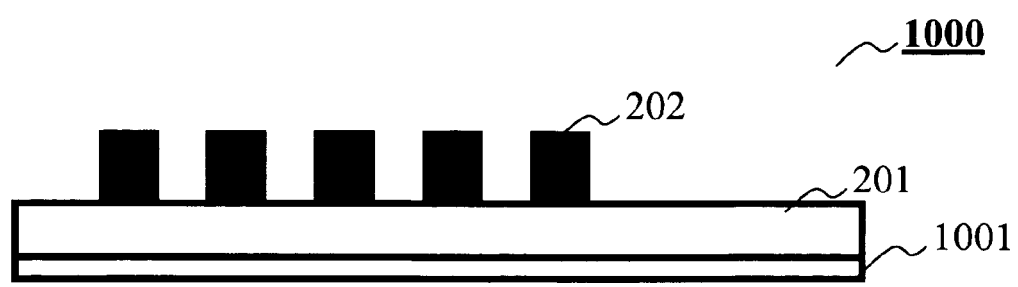
FIG. 10 is a cross sectional view of a wire-grid polarizer in accordance with an example embodiment.

FIG. 10 shows a low fill factor wire grid polarizer structure 1000 according to an example embodiment. In the present example embodiment, the wire grid polarizer is integrated with the rear absorptive polarizer 1001 and shares a common substrate 201.

Figure 11:
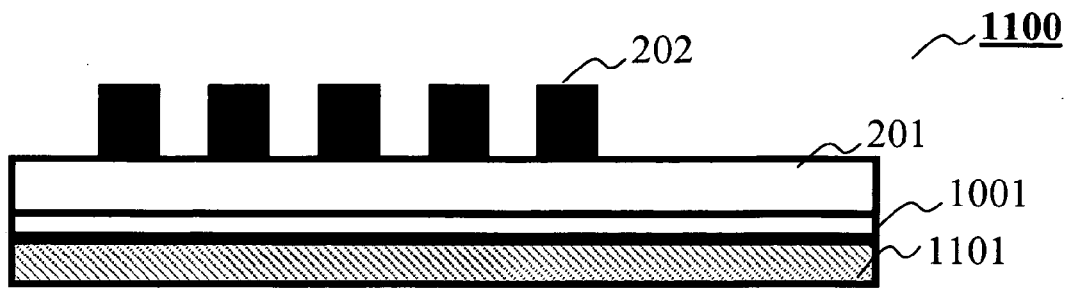
FIG. 11 is a cross sectional view of a wire-grid polarizer integrated with one or more additional functional layers in accordance with an example embodiment.

FIG. 11 shows a further example embodiment 1100 wherein other optical components such as compensation films or retardation films can also be incorporated with the wire grid polarizer. FIG. 11 depicts the wire grid elements 202 formed onto a substrate 201. An absorptive polarizer layer 1001 is shown with an additional functional layer 1101. Layer 1101 may comprise a compensation film, for example, although other functional layers could also be envisioned. While FIG. 11 does not indicate the presence of adhesive, barrier, or alignment layers, it can be appreciated that such additional layers would be found in the embodiment of FIG. 11.

Figure 12:
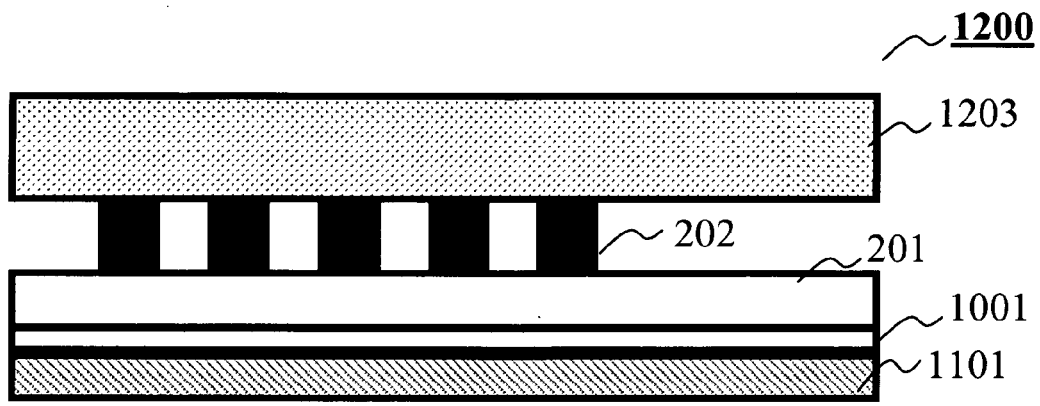
FIG. 12 is a cross sectional view of a wire-grid polarizer interior to a liquid crystal panel in accordance with an example embodiment.
Figure 13:
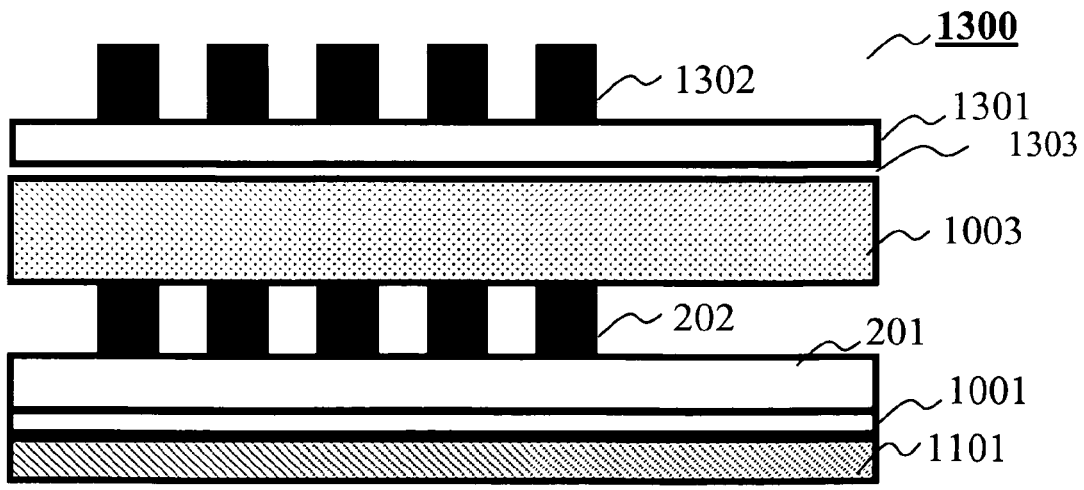
FIG. 13 is a cross sectional view of two wire-grid polarizers used in a display application in accordance with an example embodiment.

In a further example embodiment depicted in FIG. 12, the wire grid polarizer is disposed between the top and bottom substrates of a liquid crystal display panel. In this figure, a similar structure as shown in FIG. 11 is depicted by wire grid assembly 1200, with the wire grid elements 202 located directly on one surface of a substrate 1201 of the liquid crystal cell. The liquid crystal material, electrodes, color filter and other panel elements and layers are not show, but are understood to be located on the same side of substrate 1201 as the wire grid elements In another example embodiment, shown in FIG. 13, a second wire grid polarizer may be used. The second wire grid polarizer may be substantially the same as one of the wire grid polarizers of the example embodiments. The second wire grid polarizer of assembly 1300 is depicted by substrate 1301 and wire grid elements 1302. This wire grid structure is shown adjacent to the example wire grid assembly of FIG. 12. An air gap 1303 is depicted between the wire grid structure on substrate 1301 and the liquid crystal panel substrate 1003. This air gap is optional, and may be replaced by an adhesive, an index matching layer, or other material selected to produce optimal performance. The added wire grid comprising elements 1302 and substrate 1301 are preferentially located on the backlight side of the liquid crystal panel. Nominally unpolarized light impinges this first reflective polarizer, efficiently transmitting light of a single polarization state. Any residual light of the orthogonal polarization state is reflected by the wire grid polarizer located within the LC panel. It is expected that the joint operation of both wire grid polarizers may provide sufficient polarization extinction to potentially eliminate the need for the absorptive polarizer 1101. Accordingly, the two wire grid polarizers are arranged with their wire elements oriented in a parallel fashion, with the intent to further enhance the polarization extinction of the assembly.

Wire grid polarizers are used in the back light unit for LCD to increase the optical efficiency in combination with other optical components. The overall optical efficiency can be optimized with the duty cycle specified above. However, other issues associated with the use of the wire grid polarizers in the back light unit need to be addressed as well.

Since the wire gird is placed in the vicinity of the light guide, it is often exposed to heat generated by the light source 104. A high thermal expansion coefficient of the wire gird polarizer leads to the distortion in the conductor arrangement and degrades image quality of the display. Humidity also can cause the same problem. One of the methods to prevent the distortion is to integrate the wire grid polarizer with other optical elements, for example, by lamination. The examples of the optical elements are collimating films, diffuser films, absorptive polarizer and light extraction film. Other mean of integration is also possible. For example, the substrate 201 can be optical elements. Such a direct integration of optical elements eliminates the number of film used in the back light unit and reduces the cost of LCD production and thickness of the unit. Common problems in handling the optical elements are dusts attracted to the surfaces of the optical elements due to the static charge. Since wire grid polarizer contain conductive wire, integration gives anti-static function. As it is well known in the art, a wire grid polarizer absorbs significant mount of light in ultra violet region. Therefore, the wire gird polarizer can prevent "yellowing" of the optical elements due to a cumulative UV radiation from the back light unit.

The integration can also be advantageous optically. By eliminating the air gap between wire grid polarizers and other optical components, the loss due to the Fresnel reflection is reduced. LCD television application requires less collimated light. In this case particularly, wire grid polarizer integrated with diffuser film is preferred. In the following, un-limiting examples of integration of wire grid polarizer and optical elements are described.

Figure 14A:
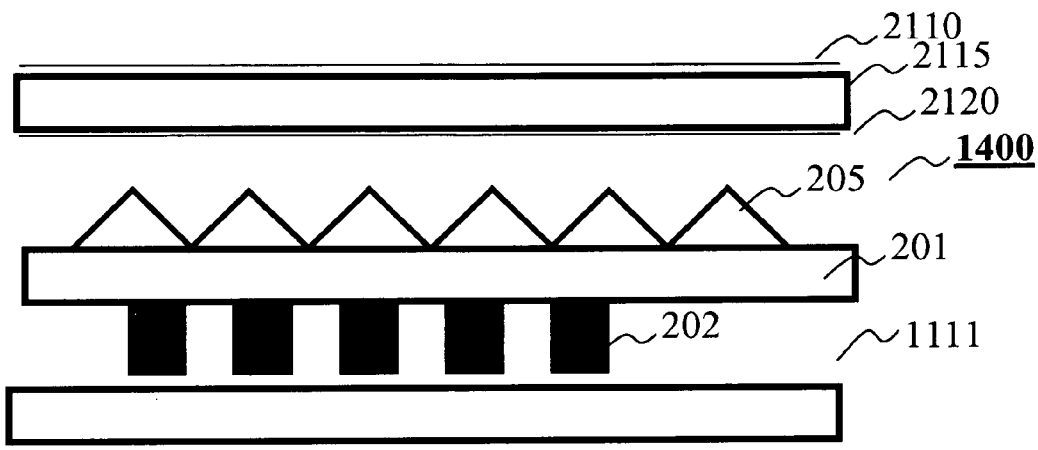
FIG. 14A is a cross sectional view of an integral optical element of a wire-grid polarizer and a collimation film used in a display application in accordance with an example embodiment.
Figure 14B:
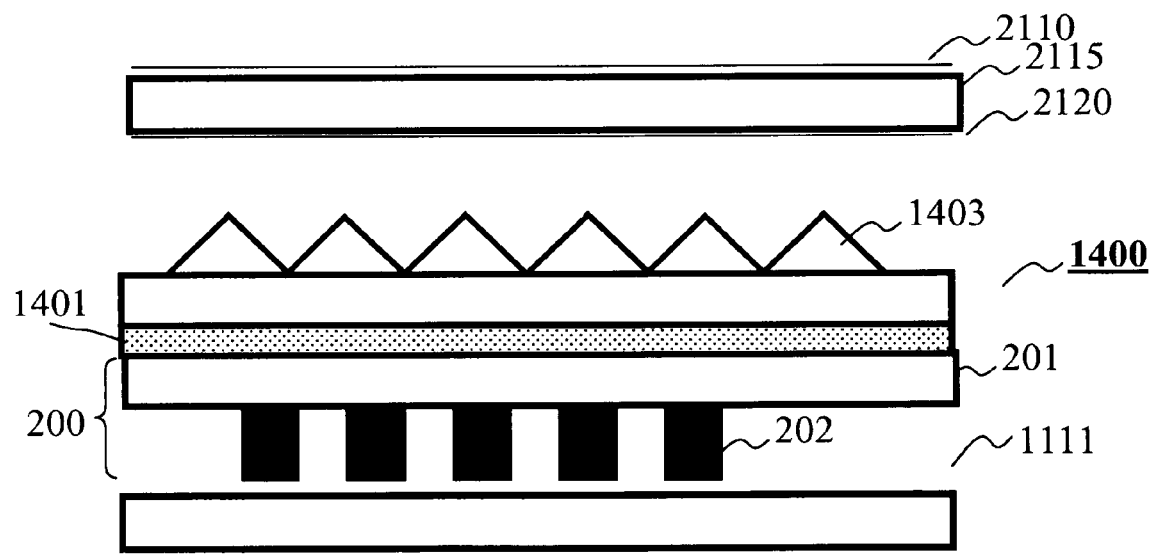
FIG. 14B is a cross sectional view of an integral optical element of a wire-grid polarizer and a collimation film used in a display application in accordance with an example embodiment.

In one example embodiment, shown in FIGS. 14A and 14B, is an integral optical element 1400 comprising a wire grid polarizer having a plurality of conductors (e.g. wires) 202 and a collimation film 205 with a common substrate 201 in-between. The conductors 202 face toward a light guide plate 1111 or its equivalent (in some cases, the light guide plate 1111 can be a cavity with a number of individual light sources, such as cold cathode fluorescent lamp (CCFL)). The collimation film is nearer to the liquid crystal display having a liquid crystal layer 2115 and a rear polarizer 2120 and a front polarizer 2110. The light guide plate 1111 generally provides a diffuse light emission through scattering light from at least a light source. While the collimation film 205 is depicted as a prism with a 90 degree apex angle in FIG. 14, it can be any up-ward type of brightness enhancement films as disclosed in U.S. Pat. No. 6,760,157, or light redirecting films with individual elements as disclosed in U.S. Pat. No. 6,752,505. The apex angle can be rounded and even take a shape of a portion of a sphere depending on the desired degree of collimation. The height and the apex angle can vary across the substrate in either one or two directions. The integral optical element 1400 further provides higher luminance in a preferred direction, which is normally along the normal direction of the substrate. The same element can be formed by laminating separately manufactured collimation film 1403 and wire grid polarizer 200 as shown in FIG. 14B. In this case, collimating film 1403 and wire grid polarizer 200 do not share common substrate but they are laminated through the lamination layer 1401.

Figure 15:
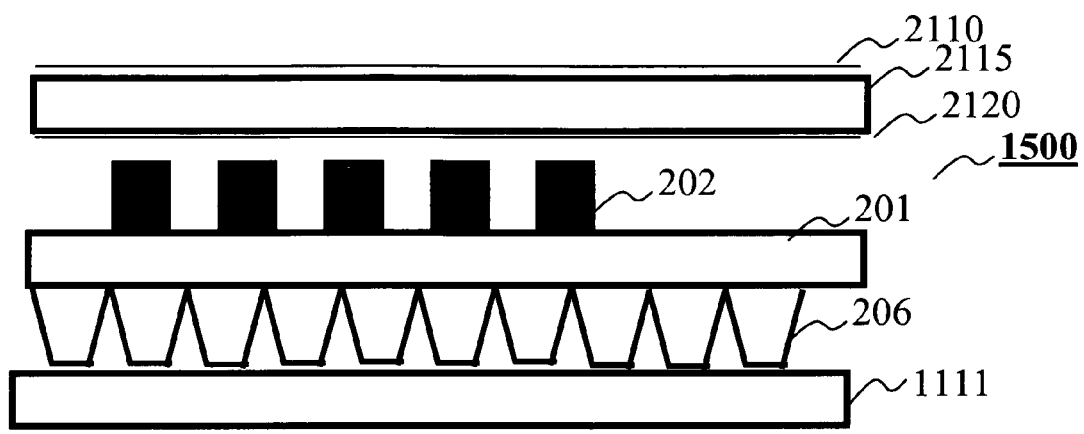
FIG. 15 is a cross sectional view of an integral optical element of a wire-grid polarizer and a collimation film used in a display application in accordance with another example embodiment.

In another example embodiment, shown in FIG. 15, is an integral optical element 1500 comprising a wire grid polarizer having a plurality of conductors (e.g. wires) 202 and a collimation film 206 with a common substrate 201 in-between. The collimation film 206 faces toward a light guide plate 1111 or its equivalent. Again, the light guide plate 1111 generally provides a diffuse light emission through scatters light from at least a light source. The collimation film 206 is down-ward type of collimation films, such as disclosed in commonly-owned U.S. Patent Application Publication No. 20050041311, which is incorporated by reference herein. The integral optical element 1400 further provides higher luminance in a preferred direction, which can be along the normal direction of the substrate, or at certain off-axis angles.

Figure 16:
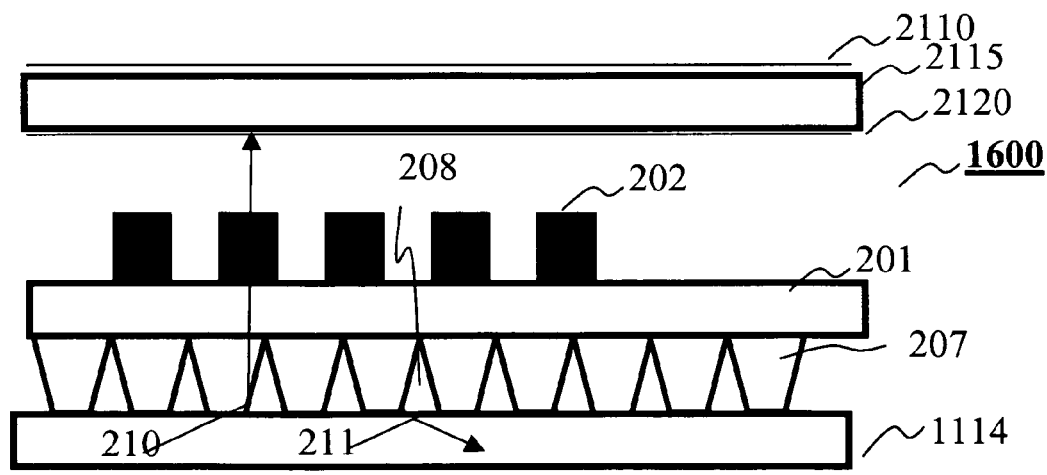
FIG. 16 is a cross sectional view of an integral optical element of a wire-grid polarizer, a light extraction means, and a light guide plate used in a display application in accordance with another example embodiment.

In another example embodiment, shown in FIG. 16, is an integral optical element 1600 comprising a wire grid polarizer having a plurality of conductors (e.g. wires) 202 and a light extraction film 207 with a common substrate 201 in-between, and further comprising a light guide plate 1114, wherein the light extraction film 207 is in optical contact with the light guide plate 1114. The light guide plate 1114 is different from the one 1111 shown in FIGS. 14 and 15 in that the light guide plate 1114 does not have diffusive elements and simply guides light from the light source from one end to another based on the total internal reflection, while the light guide plate 1111 has diffusive elements such as etched patterns or printed dots. The function of the light extraction film 207 is to break the total internal reflection condition for the light trapped in the light guide plate 1114, refract light into the light extraction film 207, and then redirect light toward a preferred direction, such as the normal direction of the substrate 201. The exemplary light 210 is extracted by the light extraction film 210, and the exemplary light 211 undergoes the total internal reflection at the interface between the light guide plate 1114 and the air 208. In general, the detailed specification for the light extraction film 207 is different from the one for the collimation film 206, though they look similar in FIGS. 15 and 16. After light is redirected toward the preferred direction, the portion with one desired polarization is transmitted through the wire grid polarizer with conductors 202, and the portion with the other undesired orthogonal polarization is reflected back toward the light source. The undesired light reflected back can be depolarized by diffusive elements around the light source, or can be converted into desired light by passing through a quarter wave plate twice coupled with a mirror (not shown in the figure). The light extraction film 207 can take various shapes. It can be an array of microprisms as disclosed in U.S. Pat. No. 5,396,350, or U.S. Pat. No. 5,428,468, with each microprism having an light input surface parallel to a light output surface and at least one sidewall tilted at an angle from the direction normal to the surface of the light guide 1114. The light extraction film 207 can also have an array of so called light collecting structures, as disclosed in U.S. Patent Application Publication No. 20050270798, wherein each light collecting structure is longitudinally extended in a length direction along the surface and has a pair of curved side walls, the curved side walls approximate having a parabolic curvature. The light extraction film 207 can also have an array of tapered structures, as disclosed in U.S. Patent Application Publication No. 20050185416, wherein each said tapered structure having a light input aperture and a larger light output aperture.

In FIGS. 14A, 14B, 15 and 16, the conductors 202 of the wire grid polarizer is shown parallel to the collimation film 205, 206 and light extraction film 208. This arrangement is preferred in an in-plane switching LCD or vertically aligned LCD, wherein the transmission axis of the rear polarizer 2120 is parallel to the length direction 301 or the width direction 302 (see FIG. 17).

Figure 17:
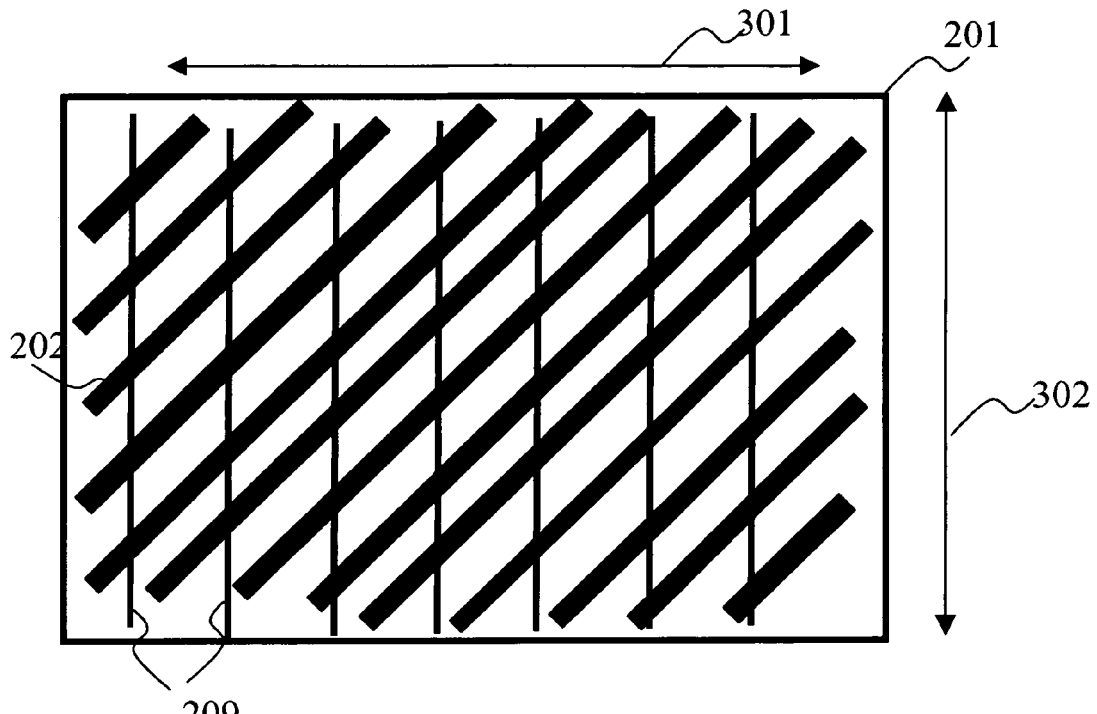
FIG. 17 is a schematic top view of the integral optical element having a wire grid polarizer.

FIG. 17 shows a schematic top view of integral optical elements 1400, 1500, and 1600 with regard to the relative orientation of the conductors 202 and light collimation film 205, 206 or light extraction film 207 when they are more or less arranged in a linear fashion. Numeral 209 denotes either the peak or valley of the collimation film 205, 206 or light extraction film 207. The conductors 202 are arranged parallel to the transmission axis of the rear polarizer 2120. The transmission axis of the rear polarizer 2120 is normally at 45 (or 135) degrees relative to the length direction 301 or width direction 302 of the liquid crystal display (LCD) for twisted nematic LCD, while it is at 0 (or 90) degrees relative to the length direction 301 or width direction 302 of the LCD for in-plane switching LCD and vertically aligned LCD. In a twisted nematic LCD, it is preferably to have the conductors 202 oriented at 45 degrees relative to the elongation direction of the collimation film 205, 206 or light extraction film 207. This arrangement maximizes the collimation and extraction efficiency of the of the collimation film 205, 206 or light extraction film 207, and simultaneously maximizes the polarization recycling efficiency of the wire grid polarizer. Due to the misalignment between the conductors 202 and films 205, 206, 207, polarization recycling can be done without a quarter wave plate and a diffusive element.

Note in FIGS. 14A through 17, the spacing and the size of the conductors 202 are exaggerated than those of films 205, 206, 207. In actuality, the spacing and the size of the conductors 202 are less than 200 nm, while the spacing and the size of the films 205, 206, 207 are normally greater than 20 microns.

Figure 18:
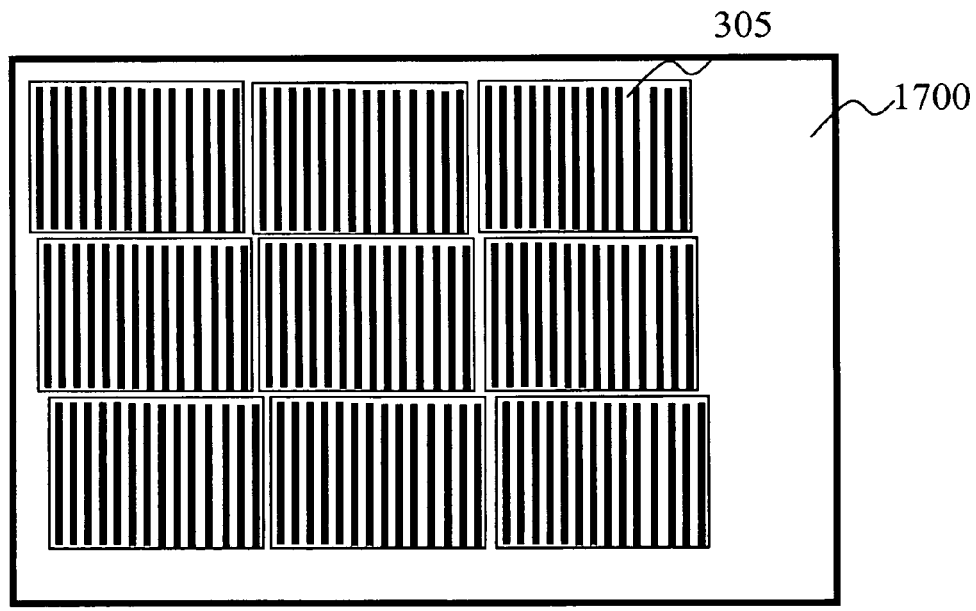
FIG. 18 is a schematic top view of a large size wire grid polarizer.

FIG. 18 shows a large size of wire grid polarizer 1700 comprising a plurality of small size wire grid polarizer 305 tiling together, which are in the range of 2 centimeters and 20 centimeters. Between two small wire grid polarizers, there might be a small shift or rotation of the conductors. Other tiling configurations are also possible, such as hexagon or honey comb pattern.

Figure 19A:
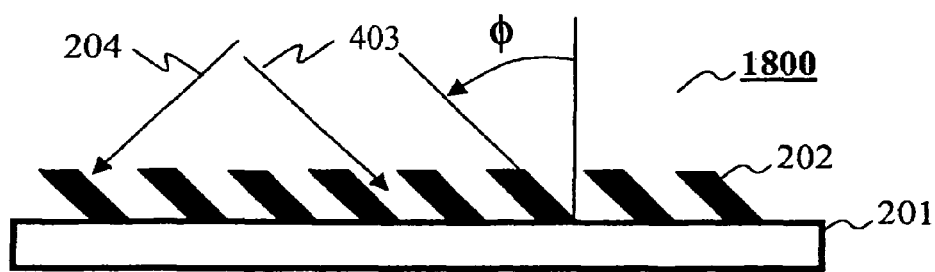
FIG. 19A is a cross sectional view of a wire-grid polarizer in accordance with an example embodiment.
Figure 19B:
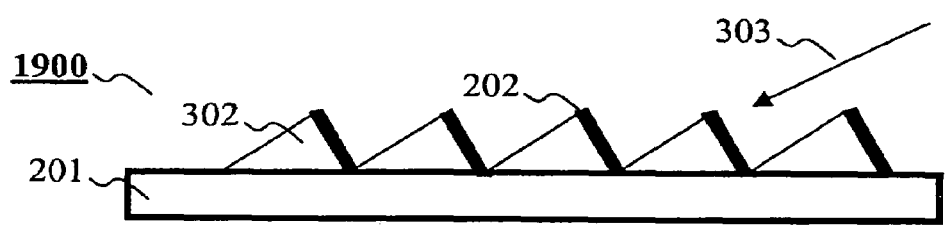
FIG. 19B is a cross sectional view of a wire-grid polarizer in accordance with another example embodiment.

FIG. 19A shows a cross-sectional view of an alternative wire grid polarizers 1800 with conductors 202 oriented at a slant angle relative to the substrate 201. In this case, the substrate 201 may be the same as the light guide plate. Additional light redirection film is needed to turn light from large angle to a preferred direction FIG. 19B shows a cross-sectional view of another alternative wire grid polarizers 1900 with conductors 202 oriented at a slant angle relative to the substrate 201. The conductors 202 are deposited on a base microstructure 302 from an oblique direction 303.

Figure 19C:
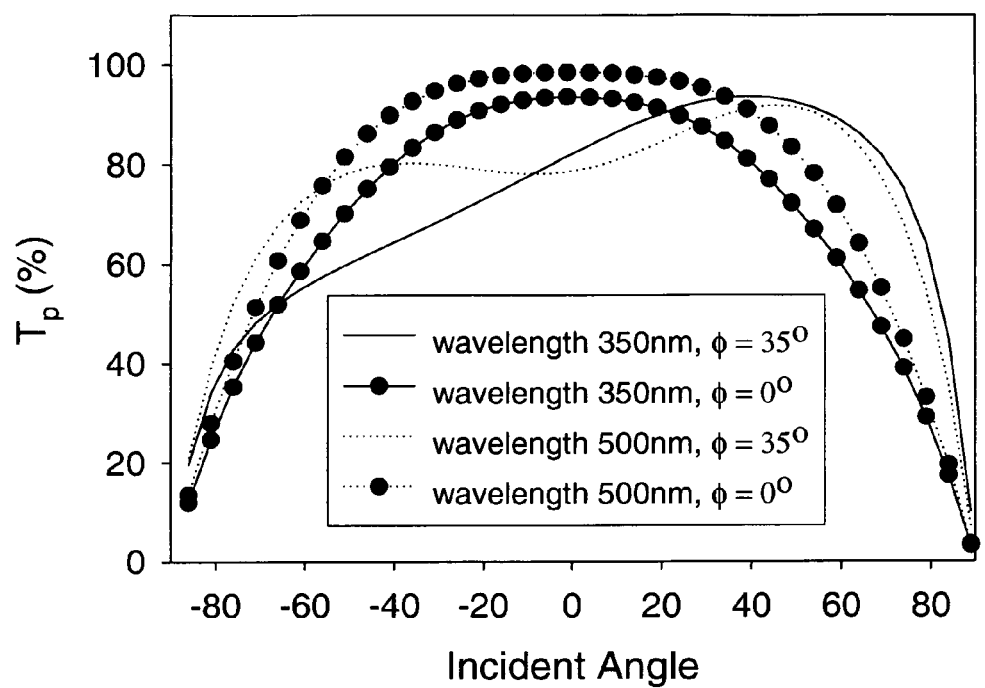
FIG. 19C is a plot of the incident angle dependence of Tp for the wire grid polarizer having structure shown in FIG. 19A in accordance with one example.

Wire grid polarizers having tilted conductors are more efficient for large angle light such as the case in wedge shaped light guide plate. The tilt of φ of the wire grid is optimized for various incident angle of the light. FIG. 19C shows an example of incident angle dependence of Tp for the wire grid polarizer having structure shown in FIG. 19A. The fill factor (or duty cycle) is 0.2. Tp is obtained for two wavelengths, 350 and 500 nm. The incident angle is taken as positive, if the incident light direction is parallel to the tile direction such as the direction indicated by an arrow 403. On the other hand, it is negative in the case for an arrow 204. FIG. 19C clearly demonstrates the benefit of tilted wire grid. If the incident angle is 50°, Tp at wavelength 350 nm increases from 72% to 93% by tilting the wire grid structure from 0° to 35°. The increase at 500 nm is from 83% to 92%. The optimum tilt φ is not necessarily the same as the incident angle. The preferred value for φ is between 10° to 55°, and more preferably between 15° to 40°.

Figure 20A:
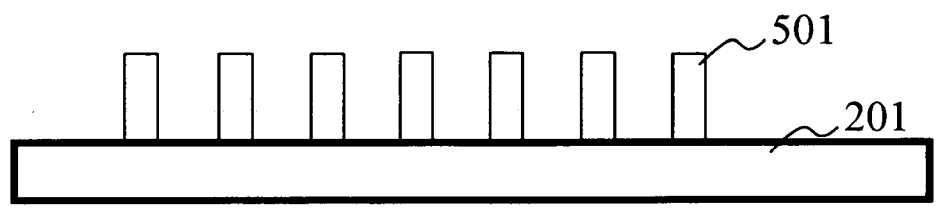
FIG. 20A is a cross sectional view of an intermediate profile of a wire-grid polarizer in accordance with an example embodiment.
Figure 20B:
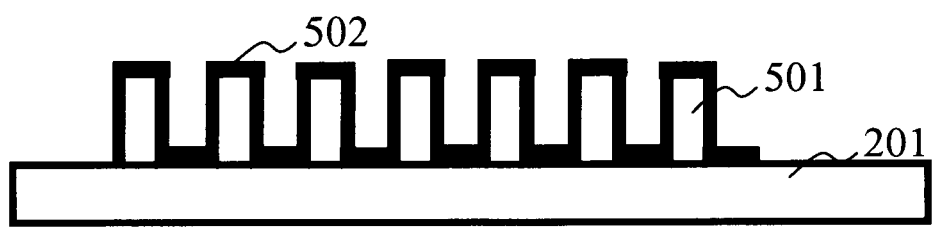
FIG. 20B is a cross sectional view of another intermediate profile of a wire-grid polarizer resulting from that of FIG. 20A.
Figure 20C:
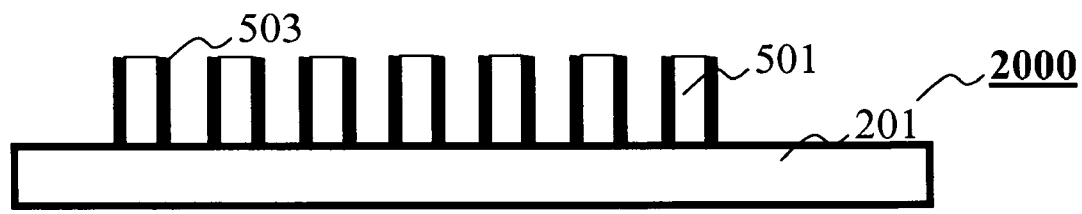
FIG. 20C is a cross sectional view of a wire-grid polarizer resulting from the intermediate profile of the wire grid polarizer shown in FIG. 20B.

FIGS. 20A though 20C show a process of making a low fill factor wire grid polarizer. First, in FIG. 20A a dielectric grid 501 is prepared on a substrate 201 using any know method discussed above. Standard lithographic methods such as photolithography, nanoimprinting lithography combined with reactive ion etching can be used to prepare dielectric gird 501. In this case, the dielectric structure 501 can be metal oxides or metal nitrides such as silicon dioxides and silicon nitrides. Second, a thin metal layer such as aluminum 502 is deposited over across the substrate as shown in FIG. 20B using a conventional vacuum deposition or sputtering procedure. Finally, partial of the metal layer 502 is removed, left with a sidewall 503, which has a low fill factor in the range of 18% to 25%. In order to remove the top portion of coated metal partially (process from FIG. 20B to FIG. 20C), directional etching method such as reactive ion etching process can be used. Reactive ion etching, due to its directionality in etching process, will selectively remove the top portion of the metal coating 502 leaving the sidewall 503. The dielectric grid 501 can be optionally removed thereafter.

As will be appreciated by one of ordinary skill in the art, by the example embodiments, light that would otherwise be lost may be reintroduced into the display system and thereby improve the brightness and contrast of the image formed. These and other benefits will become readily apparent to one of ordinary skill in the art from a review of the described example embodiments.

In accordance with illustrative embodiments, wire grids polarizers may be used in a display provide an improved optical efficiency (illuminance) compared to known structures that include specular reflectors over certain surfaces of the light guide. Further, the various methods, materials, components and parameters are included by way of example only and not in any limiting sense. Therefore, the embodiments described are illustrative and are useful in providing beneficial backlight assemblies. In view of this disclosure, those skilled in the art can implement the various example devices and methods to effect improved backlight efficiency, while remaining within the scope of the appended claims.

The invention claimed is:

1. An optical element comprising a substrate, a wire grid on one side of said substrate, and prismatic light collimating features on the other side of said substrate, wherein the wire grid comprises a plurality of parallel conductors having a pitch (P): a width (W), a height (H), and a length (L); a fill-factor (W/P) is in the range of approximately 0.18 to approximately 0.25; and an aspect ratio (L/P) that is larger than approximately 10, and wherein the conductors have an average length $L_{av}$ and an average pitch $P_{av}$; and are arranged in a substantially random fashion parallel to each other and have an average aspect ratio of $L_{av}/P_{av}$ is greater than aprroximately 10.

2. The optical element of claim 1 wherein said prismatic features comprise features of triangular cross section.

3. The optical element of claim 1 wherein said prismatic features comprise features of trapezoidal cross section.

4. The optical element of claim 1 wherein the substrate comprises polymeric film.

5. The optical element of claim 1 wherein the substrate comprises glass.

6. The optical element of claim 1 wherein the wire grid comprises aluminum.

7. The optical element of claim 1 wherein said substrate comprises a lamination of base materials of the wire grid and light collimating features.

8. The optical element of claim 1 further provided with a light guide plate adjacent to said light collimating features.

9. The optical element of claim 8 wherein the light guide plate and light collimating features are in direct contact.

10. The optical element of claim 1 further provided with a light guide plate adjacent to said wire grid.

11. The optical element of claim 1 wherein the wires of the wire grid are not parallel with the light collimating features.

12. The optical element of claim 1 wherein the wires of the wire grid are generally parallel with the light collimating features.

13. The optical element of claim 1 comprising a group of tiles of optical elements on a substrate.

14. The optical element of claim 1 wherein the width is an average width given by $$W \equiv \frac{S}{H}, \text{ where } S \equiv \int_0^H w_0(z) \text{ and } w_0(z)$$

is a width of the conductors as a function of height z.

15. A method of forming a wire grid comprising providing a substrate having dielectric wire features, coating said substrate and dielectric wire features with metal, removing the metal from the substrate and the portion of the dielectric wire features furthest from said substrate wherein the wire grid comprises a plurality of parallel conductors having a pitch (P), a width (W), a height (H), and a length (L); a fill-factor (W/P) is in the range of approximately 0.18 to approximately 0.25; and an aspect ratio (L/P) that is larger than approximately 10, wherein the wire aid comprises a plurality of parallel conductors having a pitch (P), a width (W), a height (H), and a leneth (L); a fill-factor (W/P) is in the range of approximately 0.18 to approximately 0.25: and an aspect ratio (L/P) that is lamer than approximately 10, and wherein the conductors have an average length $L_{av}$ and an average pitch $P_{av}$; and are arranged in a substantially random fashion parallel to each other and have an average aspect ratio of $L_{av}/P_{av}$ is greater than approximately 10.

16. The method of claim 15 wherein said dielectric wires comprise the silicon dioxide.

17. The method of claim 15 wherein said metal comprises aluminum.

18. The method of claim 15 wherein coating with metal is done by vacuum deposition.

19. The method of claim 15 wherein the selective removal of metal is performed by reactive ion etching.

* * * * *